(12) United States Patent
Furner et al.

(10) Patent No.: US 12,714,085 B2
(45) Date of Patent: Aug. 25, 2026

(54) BAIT STATIONS

(71) Applicant: S. C. JOHNSON & SON, INC., Racine, WI (US)

(72) Inventors: Paul E. Furner, Racine, WI (US); Greg Perkolup, Sun Prairie, WI (US); Jerome Matter, Racine, WI (US); Paul Diehl, New York, NY (US); Adriana Bueti, Milwaukee, WI (US)

(73) Assignee: S. C. JOHNSON & SON, INC., Racine, WI (US)

( * ) Notice: Subject to any disclaimer, the term of this patent is extended or adjusted under 35 U.S.C. 154(b) by 0 days.

(21) Appl. No.: 19/036,682

(22) Filed: Jan. 24, 2025

(65) Prior Publication Data

US 2025/0169486 A1 May 29, 2025

Related U.S. Application Data

(63) Continuation of application No. 18/381,529, filed on Oct. 18, 2023, now Pat. No. 12,239,120, which is a continuation of application No. 17/078,332, filed on Oct. 23, 2020, now Pat. No. 11,812,736.

(60) Provisional application No. 62/925,059, filed on Oct. 23, 2019.

(51) Int. Cl.
*A01M 1/20* (2006.01)

(52) U.S. Cl.
CPC .................................. *A01M 1/2011* (2013.01)

(58) Field of Classification Search
CPC .......... A01M 22/011; A01M 2200/011; A01M 1/2011; A01M 1/02; A01M 2200/0011; A01M 1/2005; A01M 1/2016
USPC ............................................................ 43/131
See application file for complete search history.

(56) References Cited

U.S. PATENT DOCUMENTS

| | | | | |
|---|---|---|---|---|
| 1,714,666 A | | 5/1929 | Gring | |
| 1,960,464 A | | 5/1934 | Thalheimer | |
| 2,837,861 A | * | 6/1958 | Graham, Sr. | A01M 1/04 43/131 |
| 3,220,921 A | | 11/1965 | Greenbaum et al. | |
| 3,550,308 A | | 12/1970 | Ibach | |
| 3,937,826 A | | 2/1976 | Harris | |
| 4,395,842 A | * | 8/1983 | Margulies | A01M 1/14 43/121 |
| 4,563,836 A | | 1/1986 | Woodruff et al. | |
| 4,698,934 A | | 10/1987 | Gonzalez et al. | |

(Continued)

FOREIGN PATENT DOCUMENTS

| | | |
|---|---|---|
| CA | 2533004 C | 9/2013 |
| CN | 1230873 C | 12/2005 |

(Continued)

*Primary Examiner* — Maria E Graber
(74) *Attorney, Agent, or Firm* — Quarles & Brady LLP

(57) ABSTRACT

Bait stations are disclosed that include a housing having a lower casing including a base with a first surface. The base includes an inner wall extending upward from the base toward a top edge and an outer wall extending downward from the top edge toward the base. The bait station includes an upper casing with a dome having a top surface. The dome includes an upper ramped front surface including a plurality of apertures arranged in a side-by-side arrangement. Wherein, the upper casing is coupled to the lower casing, and the plurality of apertures are spaced apart from the first surface of the base.

20 Claims, 26 Drawing Sheets

(56) References Cited

U.S. PATENT DOCUMENTS 4,709,504 A * 12/1987 Andric .................... A01M 1/14 43/121
4,761,912 A * 8/1988 Dyer .................. A01M 25/008 43/131
4,793,093 A 12/1988 Gentile
4,823,506 A 4/1989 Demarest et al.
4,834,977 A 5/1989 Kohama et al.
4,837,969 A * 6/1989 Demarest ............. A01M 1/2011 43/131
4,899,485 A 2/1990 Schneidmiller
4,985,413 A 1/1991 Kohama et al.
5,033,229 A 7/1991 Demarest et al.
5,096,710 A 3/1992 Minagawa et al.
5,119,586 A * 6/1992 Townsend ............... A01M 1/14 43/131
5,300,293 A 4/1994 Minagawa et al.
5,357,709 A 10/1994 Lin
5,454,186 A * 10/1995 Gang ...................... A01M 1/02 43/114
5,548,922 A 8/1996 Wefler
5,771,628 A 6/1998 Nobbs
5,798,112 A 8/1998 Heitz et al.
5,802,761 A 9/1998 Demarest et al.
5,850,707 A 12/1998 Fell et al.
5,885,606 A 3/1999 Kawada
5,943,816 A 8/1999 Hyatt et al.
5,943,817 A 8/1999 Miller
5,960,585 A 10/1999 Demarest et al.
5,972,330 A 10/1999 Sugiura et al.
5,983,558 A 11/1999 Las et al.
6,189,259 B1 2/2001 Soller
6,272,791 B1 8/2001 Pleasants
6,352,693 B1 3/2002 Kawada
6,370,813 B1 4/2002 Nelson et al.
6,401,384 B1 6/2002 Contadini et al.
6,581,325 B2 * 6/2003 Gordon ............... A01M 1/2005 43/132.1
6,618,983 B1 9/2003 Spragins
6,651,378 B2 11/2003 Baker
6,796,082 B1 9/2004 Duston et al.
6,871,444 B1 * 3/2005 Bernard ............... A01M 1/2011 43/131
7,043,873 B2 5/2006 Westphal et al.
7,048,918 B2 5/2006 Warner et al.
7,204,054 B2 * 4/2007 Mayo .................. A01M 1/2005 222/85
7,601,362 B2 10/2009 Sembo et al.
7,980,023 B2 7/2011 Nelson
8,266,839 B2 9/2012 Alan
8,414,875 B2 4/2013 Shih et al.
8,448,376 B2 5/2013 Yoshitake
8,793,929 B1 8/2014 Walsh
8,889,725 B2 11/2014 Gutsmann et al.
8,975,292 B2 3/2015 Taranta et al.
9,015,989 B1 4/2015 Zeamer
9,089,122 B2 7/2015 Olson et al.
9,155,306 B2 10/2015 Radabaugh et al.
9,295,247 B2 3/2016 Olson et al.
9,420,779 B1 8/2016 Denton, III et al.
9,901,092 B2 2/2018 Dairiki et al.
10,123,534 B2 * 11/2018 Olson ................... A01M 1/223
10,251,402 B2 4/2019 Mafra-Neto et al.
10,264,777 B2 4/2019 Zhang et al.
2002/0069579 A1 6/2002 Hyatt et al.
2003/0138472 A1 7/2003 Yonker
2003/0198659 A1 10/2003 Hoffmann et al.
2005/0000147 A1 1/2005 Westphal et al.
2005/0000148 A1 * 1/2005 Kraatz ................ A01M 1/2005 43/131
2005/0252074 A1 11/2005 Duston et al.
2006/0177474 A1 8/2006 Kodama et al.
2006/0207164 A1 9/2006 Pearson
2007/0071785 A1 3/2007 Craven et al.
2008/0104882 A1 5/2008 Bernard et al.
2008/0107619 A1 5/2008 Scharf et al.
2008/0196296 A1 * 8/2008 Studer ..................... A01M 1/14 43/107
2008/0286226 A1 11/2008 Toreld, III et al.
2008/0302000 A1 * 12/2008 Kidder ................ A01M 1/2005 43/131
2011/0088310 A1 4/2011 Parker et al.
2011/0252695 A1 10/2011 Pryor
2012/0017491 A1 1/2012 Gutsmann et al.
2012/0066960 A1 * 3/2012 Pryor .................. A01M 1/2011 43/131
2012/0198755 A1 8/2012 Soards
2014/0212375 A1 7/2014 Chen et al.
2015/0335003 A1 11/2015 Zeamer
2016/0150775 A1 6/2016 Berengardt et al.
2016/0366872 A1 12/2016 Olson et al.
2016/0366873 A1 12/2016 Messina
2017/0245488 A1 8/2017 Zhang
2018/0077934 A1 3/2018 Kojima et al.
2018/0139960 A1 5/2018 Sikuljak et al.
2018/0288999 A1 10/2018 Spomer et al.
2021/0368765 A1 * 12/2021 Feo ......................... A01M 1/10
2022/0206180 A1 * 6/2022 Buis ........................ A01M 1/02
2023/0094244 A1 * 3/2023 Mateer ................ A01M 1/2055 43/131

FOREIGN PATENT DOCUMENTS

CN 205390096 U 7/2016
CN 1177277 A 5/2022
EP 0202435 A2 11/1986
EP 0295442 A2 12/1988
EP 2198708 A1 6/2010
EP 3025583 A1 6/2016
ES 1073517 U 12/2010
ES 1078167 U 12/2012
ES 1079102 U 4/2013
JP 5230745 B2 7/2013
JP 2016073253 A 5/2016
KR 100895507 B1 5/2009
TW M292905 U 7/2006
WO 9107972 A1 6/1991
WO 2004012505 A2 2/2004
WO 2005110732 A2 11/2005
WO 2006023783 A1 3/2006
WO 2006088653 A2 8/2006
WO 2006124507 A1 11/2006
WO 2007010095 A2 1/2007
WO 2007104461 A2 9/2007
WO 2009087085 A2 7/2009
WO 2009150254 A1 12/2009
WO 2010025454 A2 3/2010
WO 2010060817 A2 6/2010
WO 2011089105 A1 7/2011
WO 2012107266 A1 8/2012
WO 2013056410 A1 4/2013
WO 2014020549 A1 2/2014
WO 2015081390 A2 6/2015
WO 2016088890 A1 6/2016
WO 2016107568 A1 7/2016
WO 2016166252 A1 10/2016
WO 2016170130 A1 10/2016
WO 2017062305 A1 4/2017
WO 2017151549 A1 9/2017
WO 2017202882 A1 11/2017
WO 2018057882 A1 3/2018
WO 2018118740 A1 6/2018
WO 2018162954 A1 9/2018
WO 2019027249 A1 2/2019

* cited by examiner 100
102
174
106
184
112
170
176
168
182
182
182
108
192
166
152
164
166
136
122
114
106
154
162
120
160
126
130
124
134
150

FIG. 4

BAIT STATIONS

CROSS REFERENCE TO RELATED APPLICATIONS

The present application is a continuation of U.S. patent application Ser. No. 18/381,529, filed on Oct. 18, 2023, which is a continuation of U.S. patent application Ser. No. 17/078,332 filed Oct. 23, 2020, which claims benefit of priority to U.S. Provisional Patent Application No. 62/925,059 filed Oct. 23, 2019, all of which are incorporated herein by reference in their entirety.

BACKGROUND

1. Field of the Background

The present invention relates generally to bait stations and, more specifically, to ant bait stations.

2. Description of the Background

In many areas of the world homes and businesses experience pest infestations such as ant infestations and other crawling insect infestations. Various devices typically referred to as insect bait stations have been utilized to present bait to crawling pests or insects, and are well known. One of the most popular and effective methods of combating crawling pests or insects is the use of bait, which is commonly positioned around or near a nest or near where the pests or insects gather food. According to their usual food gathering habits, crawling pests or insects will feed on the poisonous bait and take some of the bait with them back to their nests or homes where the bait is shared with other pests or insects to kill a larger number of them.

Typical bait stations have a base with various topographical features used to direct the pests or insects to the bait, and a cover that spans those features to create an enclosed bait station. In some specific implementations, these bait stations comprise various baits that can be used to combat ant infestations. Known bait stations generally include a reservoir that holds a baited composition comprising one or more active ingredients that causes pest or insects, such as ants, to be killed upon ingestion. Such devices work by luring the insects to take some of the bait back to the nest where the bait is fed to the queen and other ants within the colony. Using this method, the entire colony of ants can be eliminated.

While bait stations currently exist that include bait and one or more active ingredients that can be retrieved by one or more ants and brought back to the colony for large-scale ingestion, many currently available bait stations do not provide visual cues to a user that the bait station is effectuating a desired outcome. Further, many presently available bait stations are not discrete, which may cause users to choose to place the bait stations in unhelpful locations around the home. Still further, many prior art bait stations are poorly designed to encourage ants to enter into the bait station to retrieve the bait.

As a result, a bait station is needed that meets or exceeds consumer expectations and addresses the problems noted above. Further, such bait stations should provide a clear indication that the bait is working and efficacious. Still further, it would be advantageous if such bait stations have adequate strength and crush resistance while at the same time aiding in bait retention.

SUMMARY

According to one aspect, a bait station may include a housing having an upper casing and a lower casing coupled to form an interior cavity. The bait station includes a pad disposed within the interior cavity and having a central aperture. The pad is configured to retain a liquid. Further, the lower casing includes a base having a peripheral flange that defines an outer edge, an outer wall that is spaced apart from the outer edge and extends upwardly from the peripheral base flange to a top edge, and an inner wall that extends from the top edge to a first surface to define a receiving space therein. A tapered post is disposed within the receiving space and extends upwardly from the first surface to a post end. The tapered post is configured to extend through the central aperture of the pad and retain the pad in place. Further, the upper casing includes a plurality of apertures that are configured to allow insects therethrough into the interior cavity.

According to one aspect, a bait station for attracting and capturing insects may include a housing and a formulation. The housing includes a first surface and defines an interior cavity. The formulation includes an active ingredient and is disposed within the interior cavity. The housing defines a receiving space within the interior cavity and includes a tapered post disposed within the receiving space and extending upwardly from the first surface of the housing to a post end. Further, the housing includes a plurality of apertures that are configured to allow insects therethrough into the interior cavity.

According to one aspect, a bait station for attracting and capturing insects may include a housing that defines an interior cavity, the interior cavity being configured to hold a liquid formulation. The housing includes a dome and an upper ramped front surface having at least one aperture, the interior cavity being accessible through the aperture. Moreover, the ramped surface is configured to guide insects toward the at least one aperture so that the insects can enter the interior cavity.

According to another aspect, a bait station may include a lower casing including a base with a first surface. The base may include an inner wall extending upward from the base toward a top edge and an outer wall extending downward from the top edge toward the base. The bait station may include an upper casing with a dome having a top surface. The dome may have an upper ramped front surface including a plurality of apertures arranged in a side-by-side arrangement. The upper casing may be coupled to the lower casing. The plurality of apertures may be spaced apart from the first surface of the base.

According to one aspect, a bait station may include a housing that includes an upper casing and a lower casing coupled to form an interior cavity. A pad may be disposed within the interior cavity. The lower casing may include a base having an outer wall that is spaced from an outer edge and extends upward from the base to a top edge. The lower casing may include an inner wall that extends downward from the top edge to a receiving space, the receiving space having a tapered post. The lower casing may include an inner ramped surface spaced from the tapered post by a gap and extending toward a top edge. The upper casing may include a front ramped surface. The front ramped surface of the upper casing may be configured to guide insects through a plurality of apertures into the inner cavity. The inner ramped surface of the lower casing may be configured to guide insects down toward the gap. The gap may be disposed between an outer perimeter of the pad to enable insects to walk freely around from a first side of the housing toward a second side of the housing.

BRIEF DESCRIPTION OF THE DRAWINGS

Other aspects and advantages of the present disclosure will become apparent upon reading the following detailed description and upon reference to the drawings in which:

FIG. 4 is an exploded view of the bait station of FIG. 3;

DETAILED DESCRIPTION

While the devices disclosed herein may be embodied in many different forms, several specific embodiments are discussed herein with the understanding that the embodiments described in the present disclosure are to be considered only exemplifications of the principles described herein, and the disclosure is not intended to be limited to the embodiments illustrated. Throughout the disclosure, the terms “about” and “approximately” mean plus or minus 5% of the number that each term precedes.

The present disclosure relates in general to an apparatus for dispensing pesticides, and more particularly to an insect bait station for use with crawling pests or insects, including ants. It should be noted that while described in connection with ants, the bait stations disclosed herein may be used or otherwise adapted for use with any crawling pest or insect. It is also contemplated that the active pesticide may be combined and/or replaced with a repellent, attractant, or aromatic active.

The bait stations disclosed herein have better perceived and actual efficacy in attracting ants and eliminating a nest of ants. For example, the bait stations disclosed herein use liquid and/or gel formulations. Such formulations may have a higher sugar content than solid baits, and can be discovered more quickly by scouter ants. As such, ants are drawn to the bait more quickly than by other prior art bait stations. Further, the use of larger side-by-side doors within the bait stations allow ants to easily walk into and leave the bait station more easily when done feeding. The bait stations disclosed herein also make it easier for a first scouting ant to get to the bait, thereby more quickly establishing a pheromone trail leading to the bait, which other ants then follow to effectively treat the entire colony.

Figure 1:
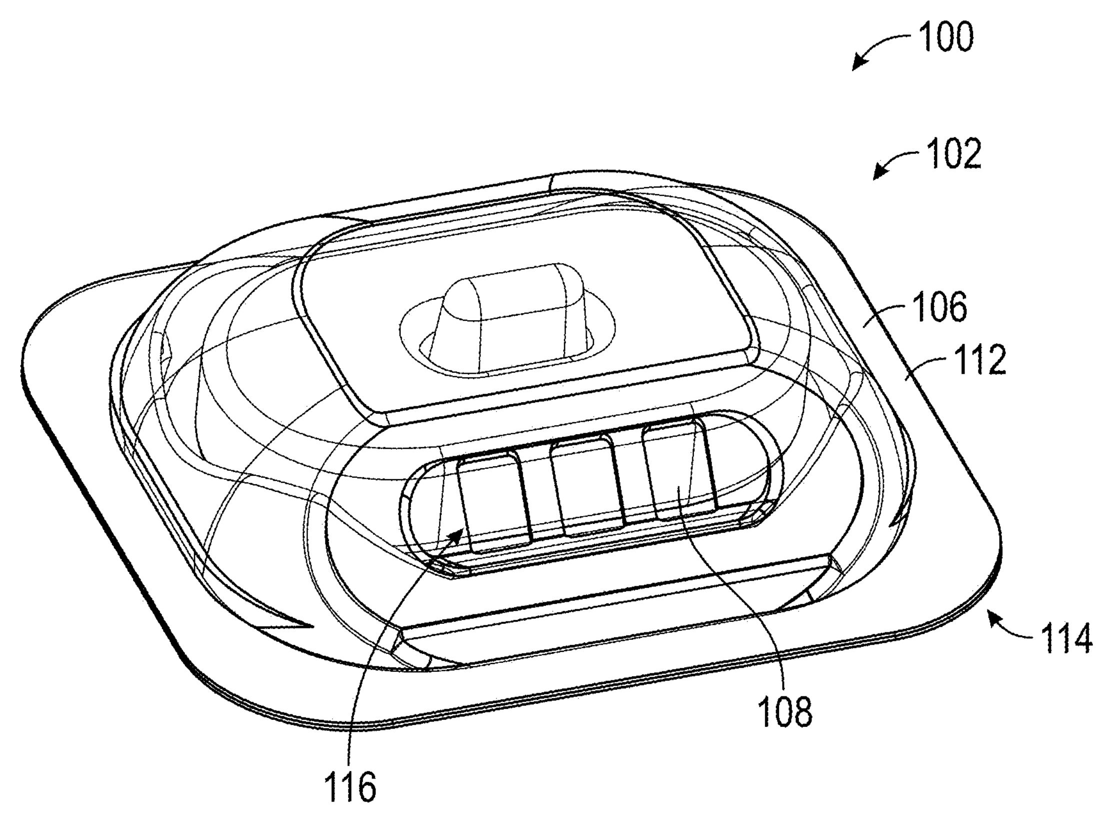
FIG. 1 is a front, top, and right side perspective view of a bait station having a pad in accordance with aspects of the present disclosure.
Figure 2:
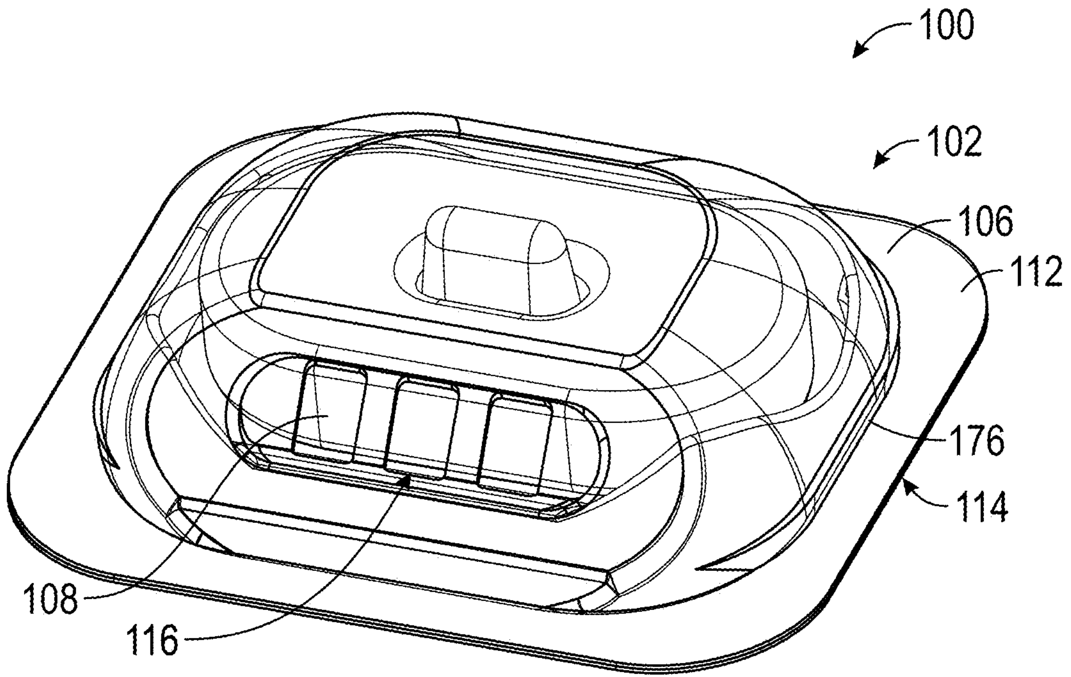
FIG. 2 is a front, top, and left side perspective view of a bait station having a pad that is similar to the bait station of FIG. 1 in a pre-use state.
Figure 3:
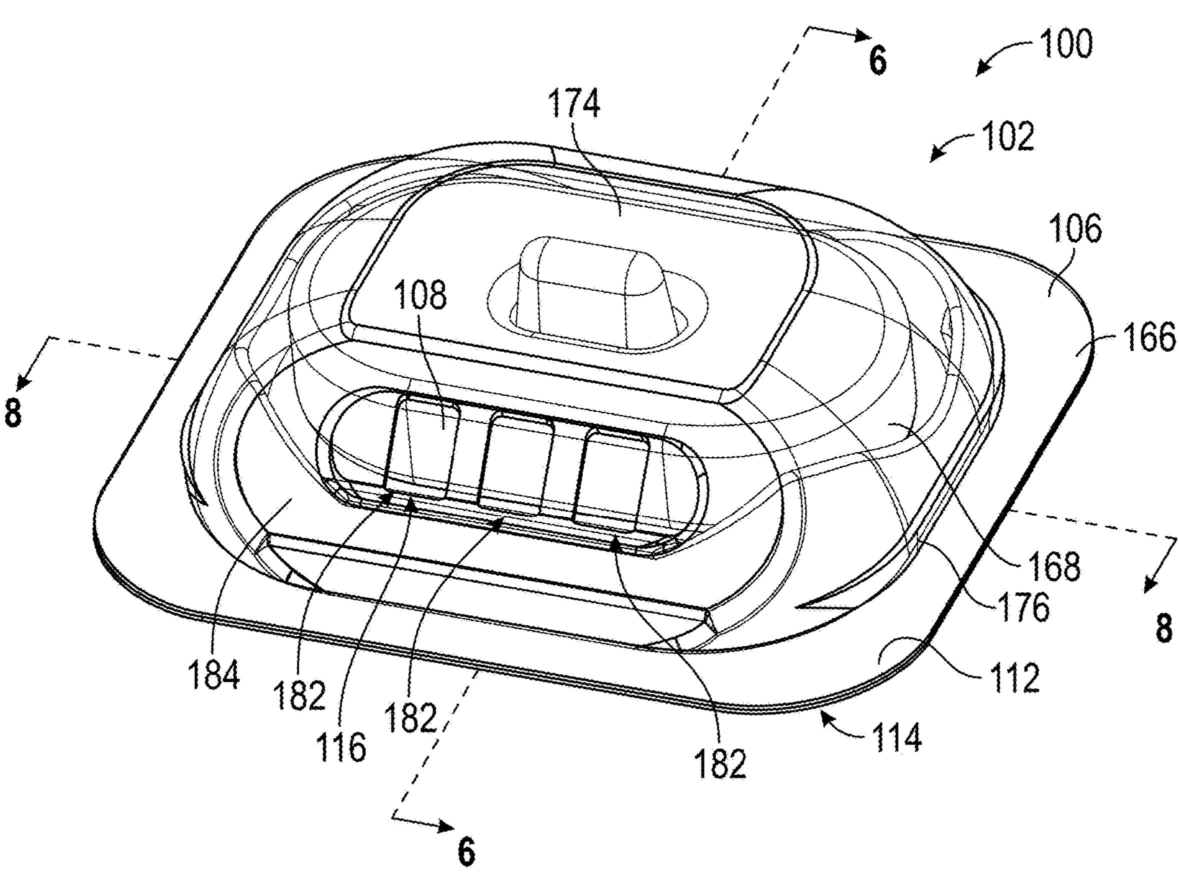
FIG. 3 is a front, top, and left side perspective view of a bait station having a pad that is similar to the bait station of FIG. 1.

Still further, the bait stations disclosed herein include discreet designs that are less accessible to pets and children. The present disclosure uses a transparent or translucent housing, which allows the user to see the ants feeding and know it is efficacious. The see-through housing further serves as a use-up cue allowing the user to know when the formula is depleted. Even further, the use of an activation peel strip with the bait stations disclosed herein provides user satisfaction of being able to activate each individual bait station. This activation feature allows consumers to easily recognize that the bait station is fresh and ready to start attracting ants. As depicted in FIGS. 1 to 9, a bait station 100 (e.g., an ant bait station 102) generally includes a housing 106 and a liquid-soaked feeding pad 108. Referring to FIG. 3, the pad 108 allows for many ants to feed at the same time within the housing 106 by providing access to the pad 108 about a 360 degree perimeter thereabout. The pad 108 may retain, hold, carry, or otherwise be soaked with a liquid, which may be a liquid formulation having an active ingredient. The housing 106 is transparent, and includes an upper casing 112 and a lower casing 114 that are coupled together, e.g., via a fit or adhesive, to form an interior cavity 116. In some embodiments, the upper casing 112 and the lower casing 114 may be ultrasonically welded. In some embodiments, the upper casing 112 and the lower casing 114 may be heat sealed. The upper casing 112 and the lower casing 114 are made from a clear plastic, such as, e.g., polypropylene. The configuration of these components for, and their inclusion in, the bait station 100 is presented as an example only. In other embodiments, other components and other configurations are possible.

Figure 4:
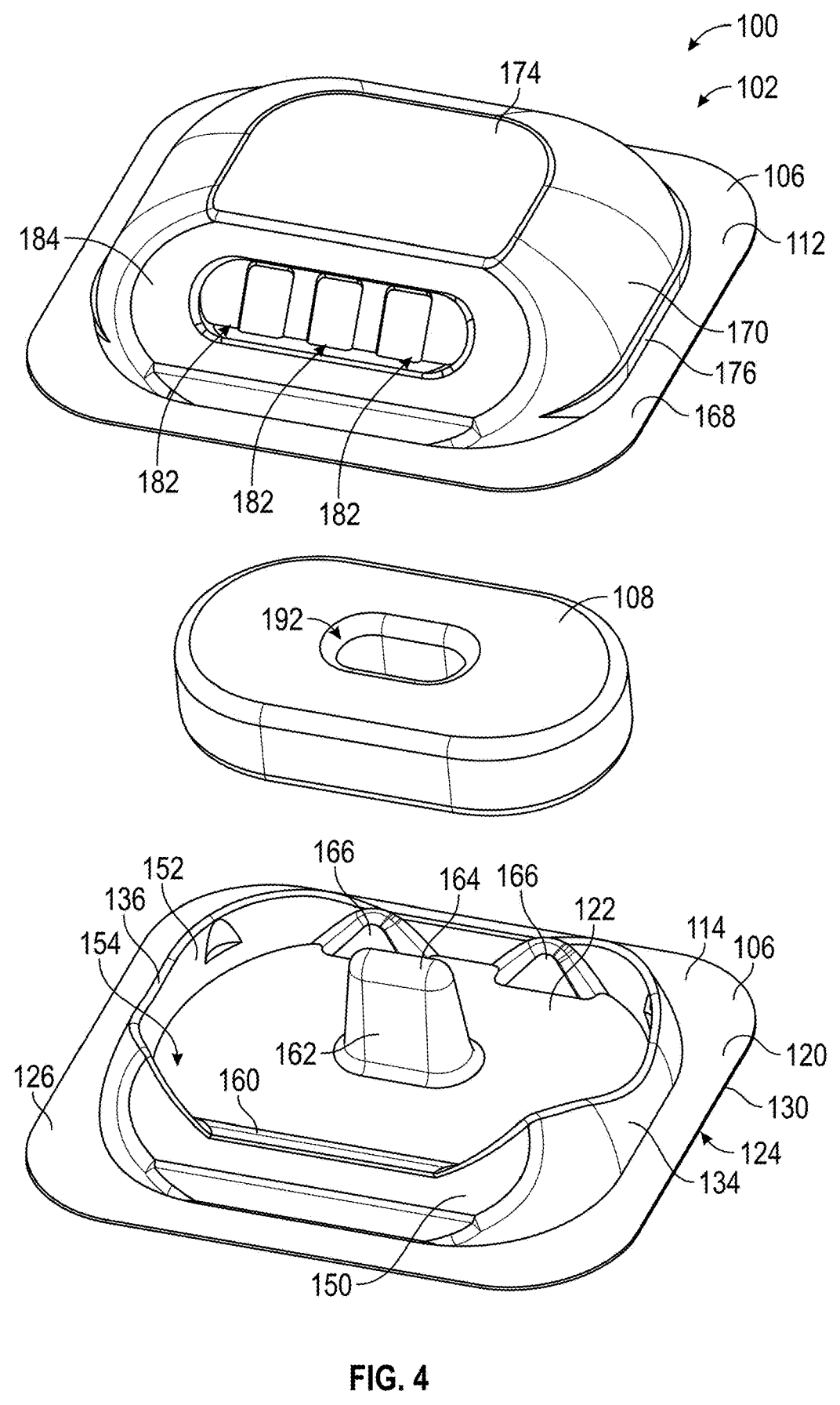

Referring to FIG. 4, the bait station 100 is shown disassembled. As mentioned above, the pad 108 is configured to be held, or retained, by the upper casing 112 and the lower casing 114. The lower casing 114 is a substantially planar component that has a curved rectangular profile and includes a base 120 having a first surface 122 and a second surface 124 facing opposite directions, and a peripheral base flange 126 that defines an outer edge 130. Further, the lower casing 114 includes an outer wall 134 that is spaced apart from the outer edge 130 and extends upwardly from the peripheral base flange 126 to a top edge 136. The outer wall 134 defines a ramped front surface 150. Further, the outer wall 134 mimics the profile of the outer edge 130. More specifically, the outer wall 134 has a curved rectangular profile.

An inner wall 152 extends from the top edge 136 to the first surface 122 substantially perpendicularly thereto and surrounds a receiving space 154. The inner wall 152 defines an inner ramped surface 160 that extends from the first surface 122 at an angle that may be greater than 100 degrees. In other instances, the inner ramped surface 160 may extend from the first surface 122 at an angle that is greater than 110 degrees. A tapered post 162 is disposed within the receiving space 154 and extends upward from the first surface 122 to a post end 164. The tapered post 162 also represents a curved rectangular profile. As will be described in greater detail herein, the tapered post 162 is configured to retain the pad 108 while also providing structural support and rigidity to the bait station 100. Furthermore, the lower casing 114 includes protrusions 166 that extend from the inner wall 152 into the receiving space 154. These protrusions 166 may be provided to align and orient the pad 108 within the receiving space 154. While the illustrated embodiment includes two protrusions 166 that are substantially triangular in shape, alternative embodiments may include more or fewer protrusions having different shapes and positioning.

Still referring to FIG. 4, the upper casing 112 includes an upper flange 168 that corresponds to the profile of the peripheral base flange 126, and further includes a dome 170 that extends upwardly from the upper flange 168 to a top surface 174. Differently said, the upper flange 168 extends outwardly from a periphery of the dome 170. The upper casing 112 may further include a de-nesting feature 176 disposed at a junction of the upper flange 168 and the dome 170. As shown in FIG. 7, in the embodiment illustrated, the de-nesting feature 176 is a protrusion that creates an internal corner 177 that may facilitate removal of the upper casing 112 from a mold during manufacturing thereof. In the embodiment illustrated, the de-nesting feature 176 extends around the dome 170 for at least 180 degrees; however, in alternative embodiments, the de-nesting feature may extend around the dome 170 for less than 180 degrees. Further, the de-nesting feature in alternative embodiments may be disposed at various locations on the upper casing 112. When the bait station 100 is assembled, the upper casing 112 is seated on and permanently secured to the lower casing 114, such that the upper flange 168 of the upper casing 112 is layered on the peripheral base flange 126 of the lower casing 114, and an interior surface 178 (see FIG. 6) of the dome 170 rests against the outer wall 134 of the lower casing 114. Once assembled, the dome 170 of the upper casing 112 and the inner wall 152 of the base 120 cooperate to define the interior cavity 116 and provide a protective covering that encases the pad 108.

As discussed above, in some embodiments, the upper casing 112 and the lower casing 114 may be ultrasonically welded. For example, the upper flange 168 and the peripheral base flange 126 may be welded along at least a portion thereof. In some embodiments, the upper flange 168 and the peripheral base flange 126 may be welded along an entire length or periphery thereof. Further, in some embodiments, the flanges 168, 126 may be welded along a racetrack-shaped path disposed between the outer wall 134 and the outer edge 130. Additionally or alternatively, the upper flange 168 and the peripheral base flange 126 may be coupled via fasteners, adhesives, press-fits, or heat sealing, for example. Ultrasonic welding, however, may be particularly useful because it creates a hermetic seal between the upper flange 168 and the peripheral base flange 126, thereby creating a substantially leak-proof seal. Consequently, bait stations according to embodiments of the present disclosure may be mounted in a variety of orientations without experiencing leaks. For example, the bait station 100 of the illustrated embodiment may be mounted to a vertical wall so that its peripheral base flange 126 is substantially parallel to the vertical wall. The seal established by ultrasonic welding may prevent liquid or gel composition leakage.

Returning to FIG. 3, the upper casing 112 further includes a plurality of apertures 182 on an upper ramped front surface 184 that provide access to the interior cavity 116. The apertures 182 provide entryways through which insects, such as ants, may enter and exit the housing 106. As will be described further herein, prior to use, a peelable label 188 (see FIG. 30) is disposed over the apertures 182 to seal the apertures 182 and the interior cavity 116. The upper casing 112 and the lower casing 114 are constructed from a transparent or translucent material and, as a result, the pad 108 is visible to a user therethrough. In a different embodiment, one of the upper casing 112 and the lower casing 114 is constructed from a transparent or translucent material, e.g., the upper casing 112. Further, the upper casing 112 and/or the lower casing 114 of the housing 106 may be composed of a thermoplastic polymer, such as polypropylene.

Figure 5:
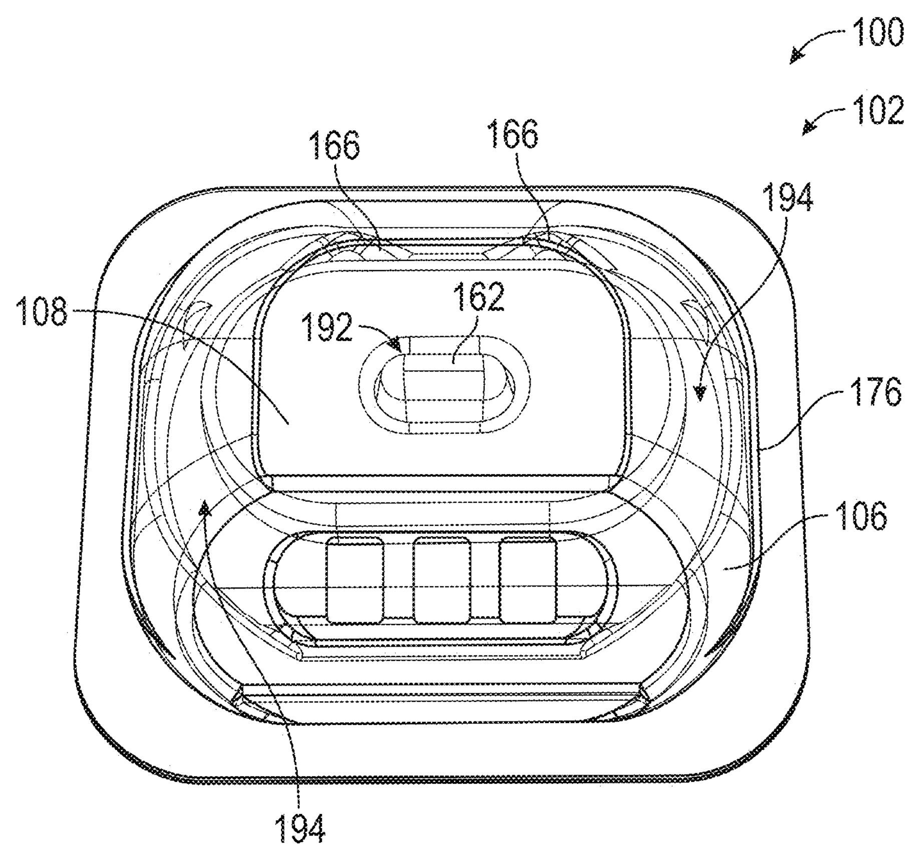
FIG. 5 is a front and top view of the bait station of FIG. 2.
Figure 6:
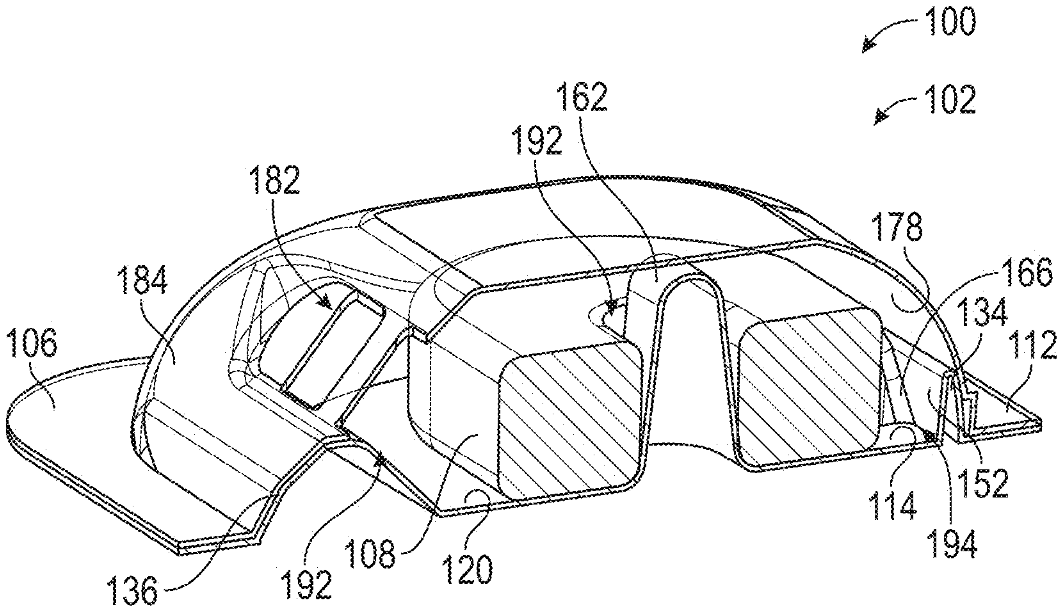
FIG. 6 is a front, top, and left side cross-sectional view taken through line 6-6 of FIG. 3.
Figure 7:
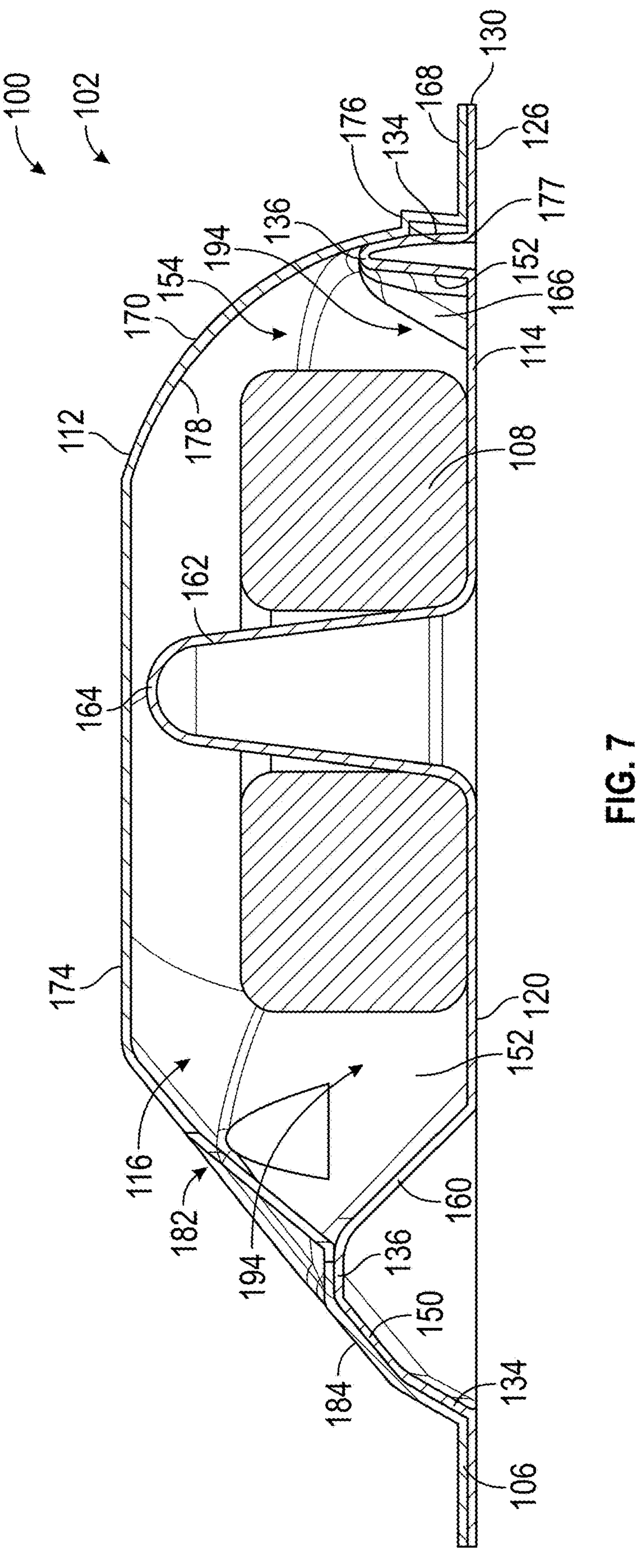
FIG. 7 is an elevational view of a cross-section taken through line 6-6 of FIG. 3.
Figure 8:
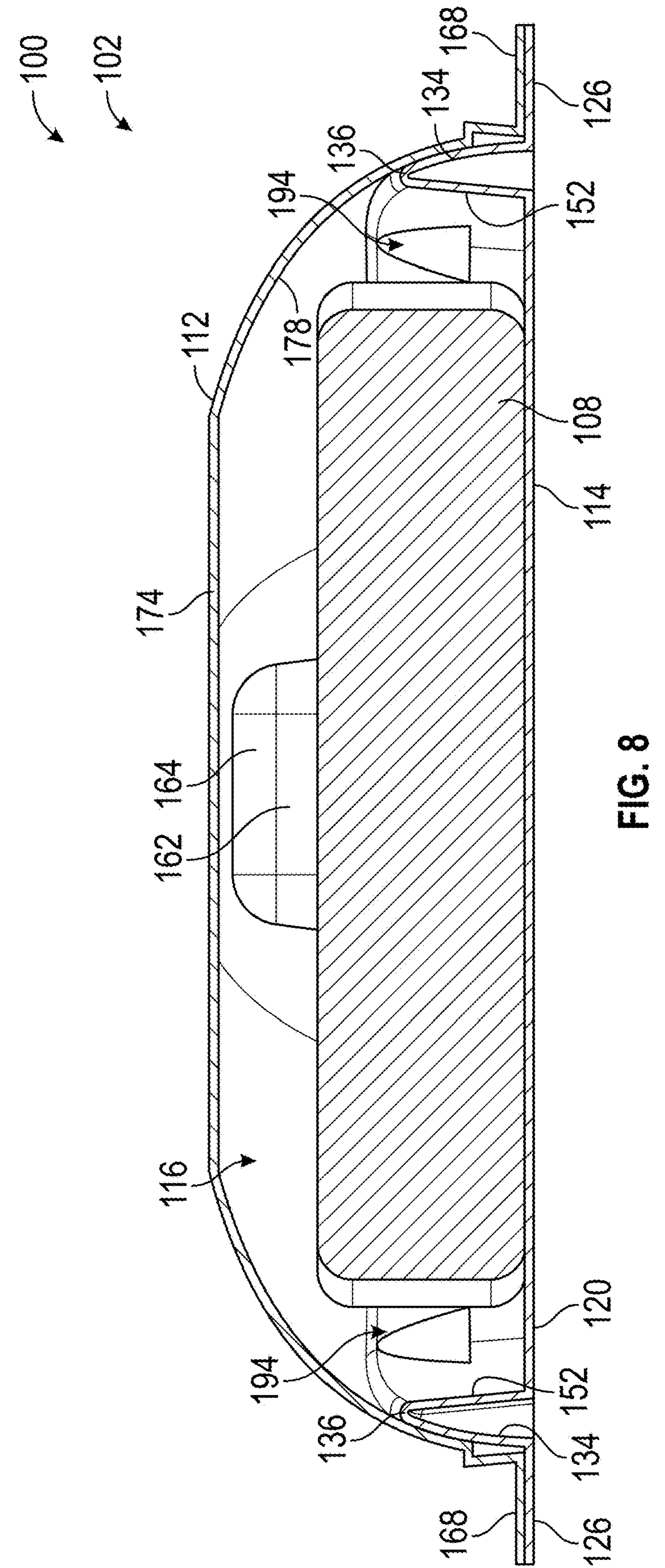
FIG. 8 is an elevational view of another cross-section taken through line 8-8 of FIG. 3.

Referring to FIGS. 5 and 6, the pad 108 is shown in greater detail. The pad 108 is generally racetrack-shaped and includes a central aperture 192 having a shape that conforms to a profile of the tapered post 162. As best seen in FIG. 5, once the bait station 100 is assembled, the tapered post 162 extends through the central aperture 192 of the pad 108, as shown in the cross-sectional view of FIG. 6. Further, a space or gap 194 is defined between the pad 108 and the inner wall 152 of the base 120, such that an ant may access or come in contact with an entire outer perimeter of the pad 108.

The pad 108 comprises a polymer-based material, such as polyethersulfone, and is treated with a liquid formulation having an active ingredient, such as spinosad. However, alternative active agents are contemplated. In some embodiments, the formulation may comprise between about 0.005% and about 0.050% active ingredient, or between about 0.010% and about 0.040% active ingredient, or about 0.015% active ingredient. The pad 108 is configured to contain the liquid bait formulation and to prevent release or leaking of the liquid bait formulation from the housing 106. Specifically, the high absorption capacity of the pad 108 ensures spills or leaks are avoided. Gravity and surface tensions at a bottom of the pad 108 also allow insects (e.g., ants) to feed at a bottom of the pad 108. The tapered post 162 also provides reinforcement to the bait station 100 and prevents the pad 108 from being squeezed and releasing liquid when in use. Further, because the pad 108 includes a liquid impregnated therein, it provides a visual cue regarding the efficacy of the bait station 100. For example, users can see through the housing 106 that the pad 108 is soaked with condensate, and the transparent housing further serves as a use-up cue allowing the user to see when the liquid is depleted. The pad 108 may use dyes to visually indicate condensate concentrations.

Returning to FIG. 3, as mentioned above, the upper casing 112 includes the plurality of apertures 182 disposed on the upper ramped front surface 184 to provide access to the interior cavity 116. The apertures 182 are access points for ants, and the use of multiple openings improves the efficacy of the bait station 100. The apertures 182 are sized to allow access to only insects, such as ants, and prevent human contact. In the embodiment illustrated, three apertures 182 are used. However, other embodiments may use more or fewer apertures 182. Similarly, although the apertures 182 of the illustrated embodiment are substantially rectangular in shape, other embodiments may use apertures that are oval, circular, square, triangular, etc. The apertures 182 are arranged in a row along a length of the upper ramped front surface 184. Additional embodiments may use any arrangement of apertures 182. Being disposed on the upper ramped front surface 184 allows the apertures 182 to be easily accessed by the ants.

Referring to FIG. 7, a cross-sectional view of the bait station 100 is shown. The plurality of apertures 182 are positioned between the upper flange 168 and the top surface 174 of the upper casing 112. More specifically, the plurality of apertures 182 are positioned adjacent the top edge 136 of the lower casing 114 when assembled. As a result, the bait station 100 is configured so that insects can travel over the upper ramped front surface 184, through the apertures 182, and down the inner ramped surface 160 to reach the pad 108. The plurality of apertures 182 are spaced from the base 120 of the lower casing 114 during use, which provides the gap 194 that enables an insect to access or come in contact with the pad 108. Further, referring to FIGS. 7 and 8, the gap 194 extends around an entire outer perimeter of the pad 108 to enable insects to access the entire perimeter thereof.

Figure 9:
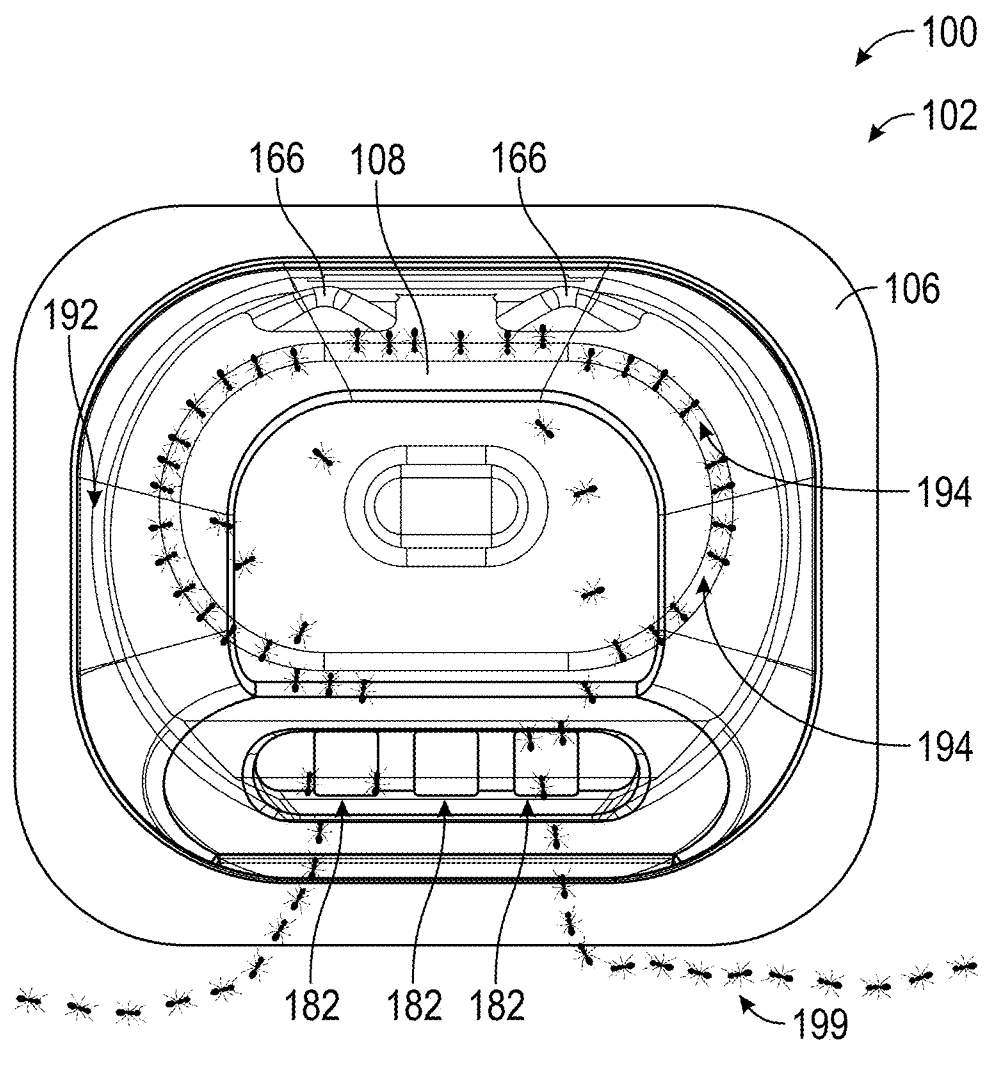
FIG. 9 is a top view of the bait station of FIG. 2 in an in-use state, wherein a plurality of ants are shown feeding on bait impregnated into the pad.

Referring to FIG. 9, therefore, the apertures 182 and the gap 194 enable ants 199 to walk around the pad 108 without getting stuck. The pad 108 provides 360 degree feeding, thereby accommodating large amounts of ants or other insects. As a result, a large amount of ants may feed from the pad 108, which allows then to return and eliminate their colony or nest.

Figure 10A:
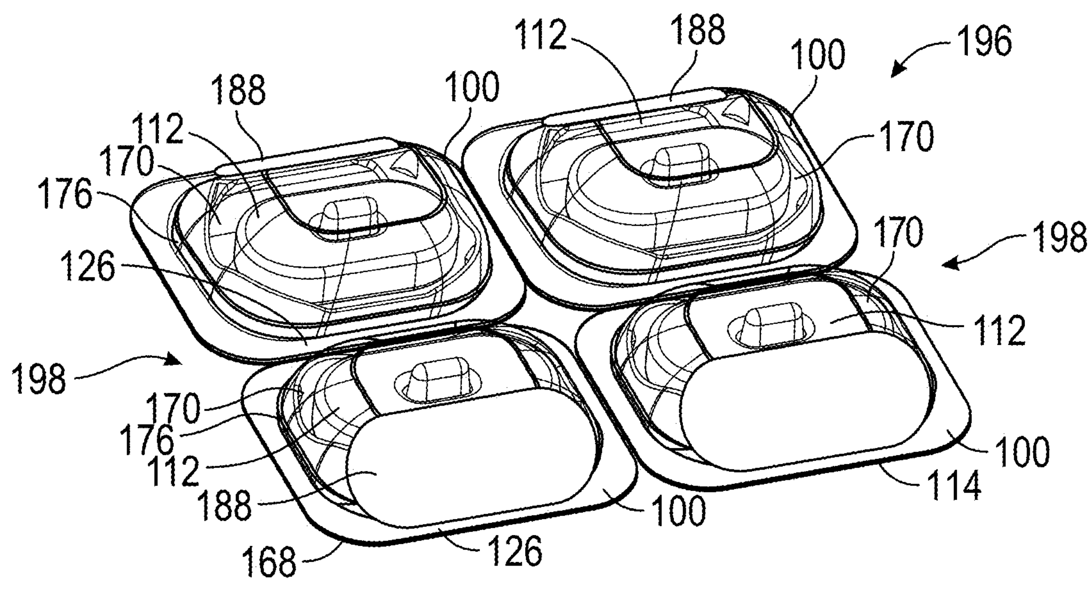
FIG. 10*a* is a front, top, and right side perspective view of a pack of four bait stations that are secured to one another along breakable seams.
Figure 10B:
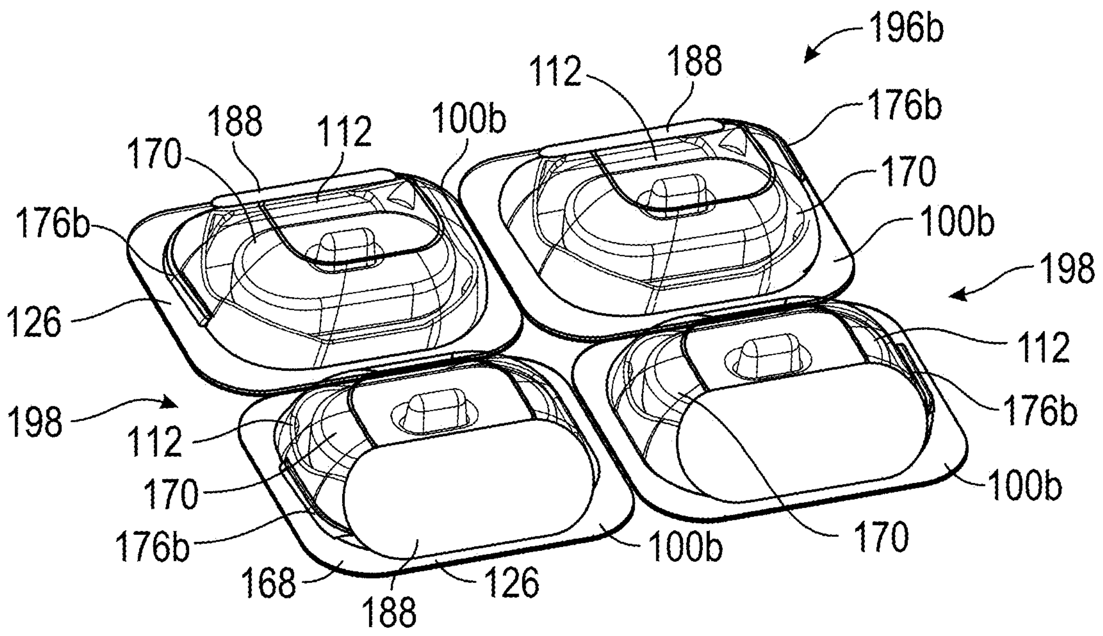
FIG. 10*b* is a front, top, and right side perspective view of another pack of four bait stations that are secured to one another along breakable seams.

Referring to FIG. 10*a*, the bait station 100 is provided in a pack of four 196, and individual stations may be separated from the pack when desired. Perforations or score lines are provided between the flanges 126, 168 of the bait stations 100 when connected to one another in pack form, which allows a user to separate an individual bait station 100 when desired. Accordingly, the upper casings 112 and the lower casings 114 may be produced in sets of four. FIG. 10*b* illustrates another pack of four 196*b* comprising bait stations 100*b* according to another embodiment of the present disclosure. The bait stations 100*b* are substantially identical to the bait stations 100 shown in FIGS. 1-10*a*, with identical elements identified using like reference numerals. However, the bait stations 100*b* differ in some aspects, as described herein or as apparent from the figures. For example, each of the bait stations 100*b* includes a de-nesting feature 176*b* that is disposed on a smaller portion of the upper casing 112 when compared to the de-nesting feature 176 shown in FIG. 4, e.g., between 80 and 120 degrees around the dome 170. Further, the de-nesting features 176*b* may be disposed at different locations on the bait stations 100*b*. More specifically, the de-nesting features 176*b* are disposed on portions of the upper casings 112 that correspond to sides 198 of the pack of four 196*b* to facilitate removal of the collective four upper casings 112 from a mold during manufacturing thereof. Therefore, two of the bait stations 100*b* may have their de-nesting feature 176 disposed on a side of the dome 170 that is different from the other two bait stations 100*b*. In some embodiments, the de-nesting features may occupy the upper casing 112 for less than 180 degrees about the dome 170. In some embodiments, the de-nesting features may occupy the upper casing 112 for less than 100 degrees about the dome 170.

Figure 11:
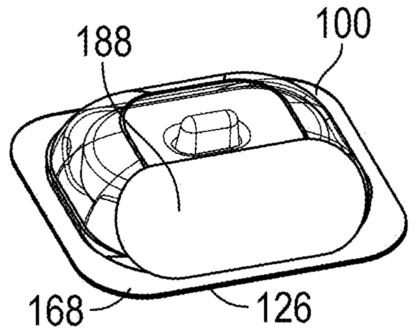
FIG. 11 is a front, top, and right side perspective view of one of the bait stations of FIG. 10*a* having a removable label disposed along entryways into the bait station.
Figure 12:
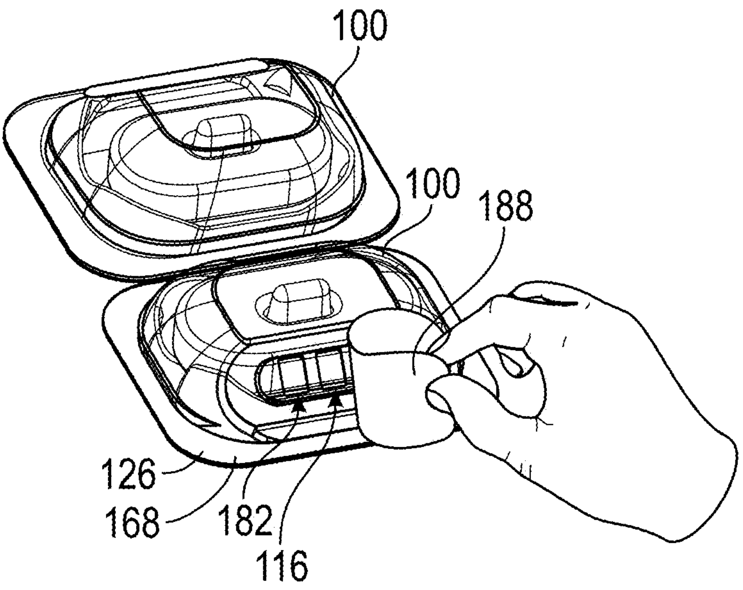
FIG. 12 is a front, top, and right side perspective view of a user removing the removable label shown in FIG. 11.

Referring now to FIGS. 10*a*, 11, and 12, as mentioned above, the peelable label 188 is provided over the apertures 182 to seal the apertures 182 and the interior cavity 116 prior to use. The peelable label 188 enables the bait station 100 to have an enhanced shelf life. For example, the bait station 100 may be stored for three years before use. Further, providing the peelable label 188 on each individual bait station 100 in a pack allows for a user to select which bait station 100 and how many bait stations 100 to use. That is, a user may remove the peelable label 188 from only one bait station 100 in a pack so that only one bait station 100 is activated. The peelable label 188 is configured to be easily removed by a user.

Figure 13:
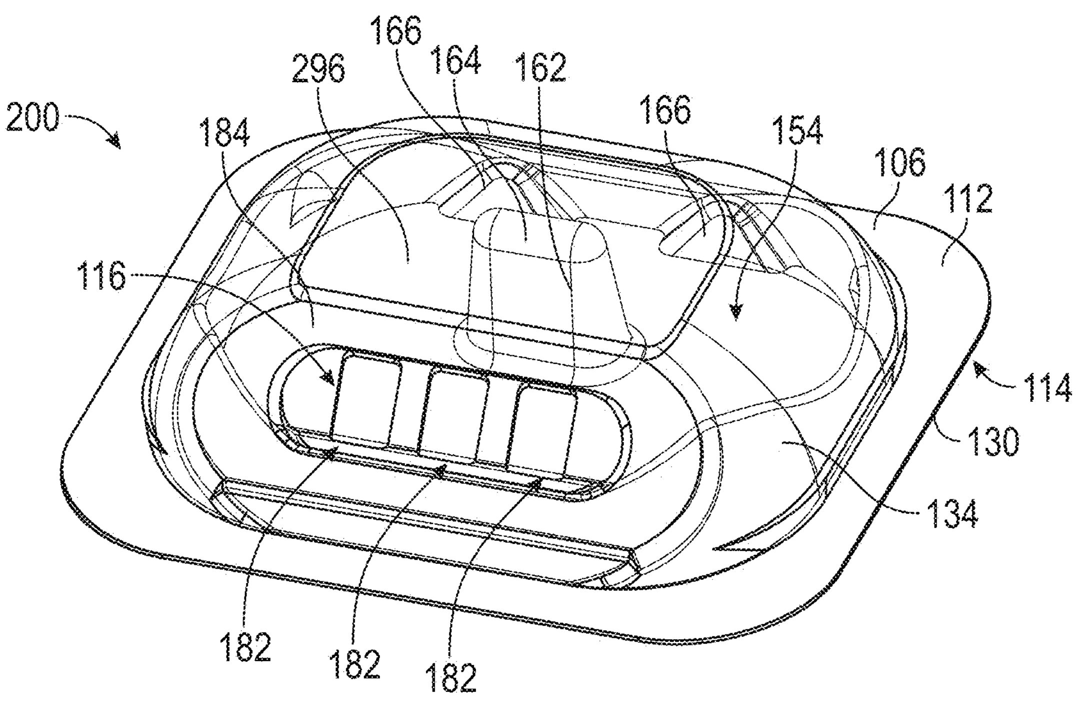
FIG. 13 is a front, top, and left side perspective view of another bait station that includes bait in the form of a gel and in a pre-use state.
Figure 14:
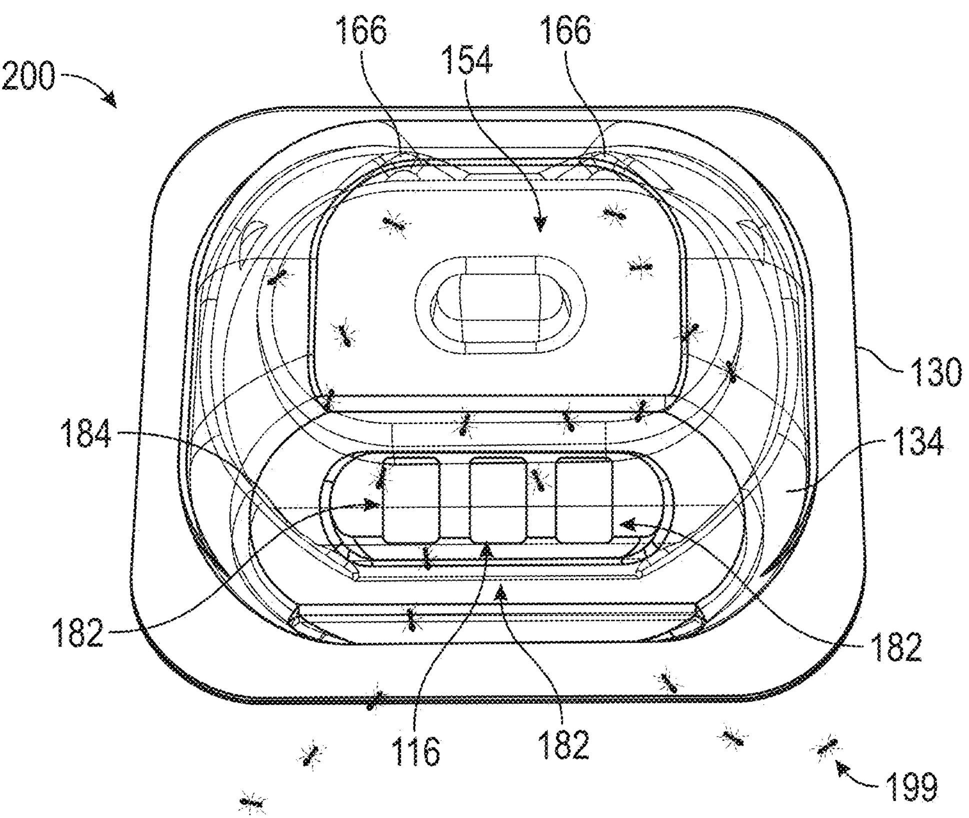
FIG. 14 is a top view of the bait station of FIG. 13 in an in-use state, wherein a plurality of ants are shown feeding on bait within the gel.

FIGS. 13 and 14 illustrate a bait station 200 according to another embodiment of the present disclosure. Similar to the embodiment illustrated in FIGS. 1-12, the configuration of these components for, and their inclusion in, the bait station 200 is presented as an example only. Further, the bait station 200 is substantially identical in design and functionality to the bait station 100, with identical elements identified using the same reference numerals, except as described herein or as apparent from the figures.

The bait station 200 includes a gel 296. The gel 296 has a large "pool" surface area for ants to congregate along to eat and share food by a process called "tropholaxis". More specifically, in the illustrated embodiment the gel 296 is disposed on the first surface 122 in the receiving space 154 of the lower casing 114 (see, e.g., FIG. 3). The gel 296 may be a gel that shrinks and dries up. The gel 296 may include water, an active ingredient, and a thickener such as carrageenan, in any amount that is effective and appropriate for causing the water and the insecticidally-active ingredient to form a gel. In some embodiments, Indoxacarb is the active ingredient. For example, the gel 296 may be composed of 0.1% Indoxacarb. Further, the gel 296 may be an aqueous gel that may include at least 10 wt % water.

In one embodiment, the gel 296 may be a hydrogel that allows easy feeding, provides non-spill storage for liquid bait without liquid dripping, and allows uninhibited ant feeding. Generally, hydrogels provide accessibility similar to liquids, while behaving like a solid. For example, hydrogels are not free-flowing and, thus, would prevent ants from getting stuck. Further, due to the viscosity of hydrogels, they are generally spill resistant, which can reduce mess when tipping the bait station 100. Accordingly, the bait station 200 may be placed at an angle or vertically without leaking its contents.

FIGS. 15-21 illustrate a bait station 300 (e.g., an ant bait station 302) according to another embodiment of the present disclosure. Similar to the aforementioned embodiments, the configuration of these components for, and their inclusion in, the bait station 300 is presented as an example only. Further, the bait station 300 may be similar in design and functionality to the bait station 100 of FIGS. 1-12, with similar elements identified using like reference numerals, except as described herein or as apparent from the figures.

Figure 15:
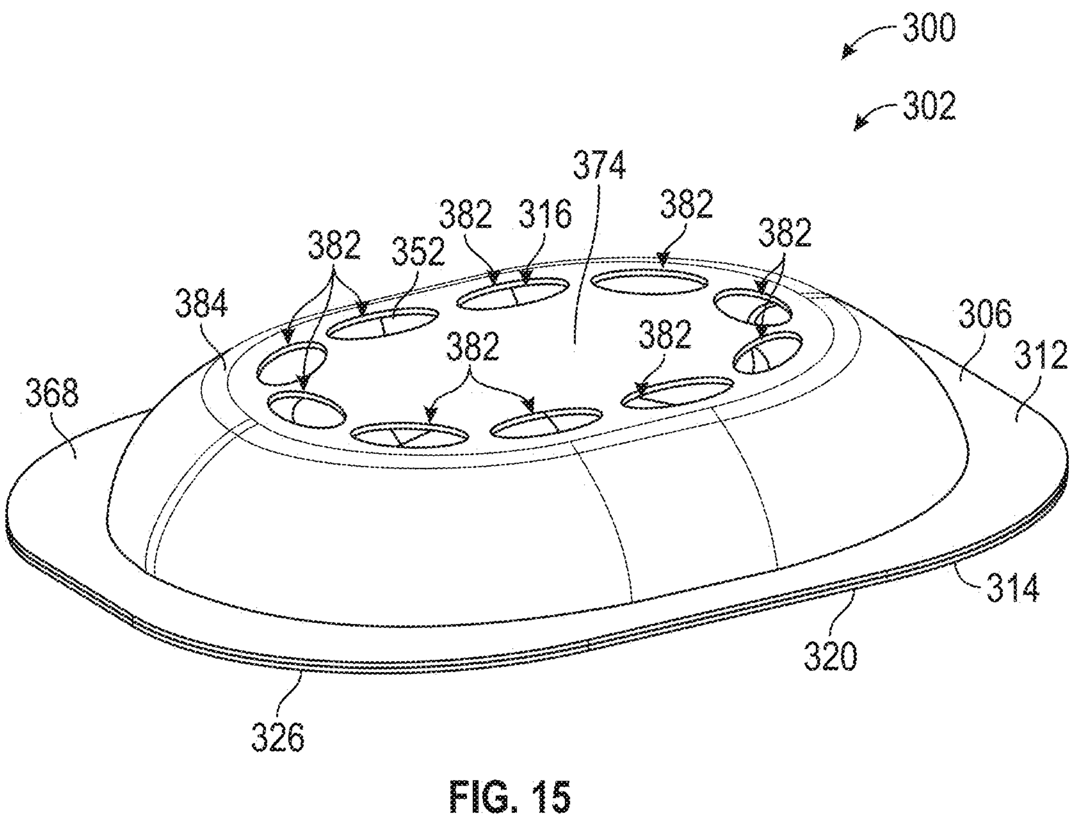
FIG. 15 is a front, top, and right side perspective view of another bait station in accordance with aspects of the present disclosure.

Referring to FIG. 15, similar to the bait station 200 illustrated in FIGS. 13 and 14, the bait station 300 includes a housing 306 that is configured to hold a gel. The housing 306 includes an upper casing 312 and a lower casing 314 that are coupled together, e.g., via a fit or adhesive, to form an interior cavity 316. Although FIGS. 15-19 do not depict the bait station 300 with a gel disposed therein, it should be understood that the bait station 300 is configured to hold a gel. For example, the bait station 300 is configured to hold the gel 296 shown in FIGS. 13 and 14. Additionally or alternatively, the bait station 300 may hold a liquid soaked feeding pad (see, e.g., the liquid soaked feeding pad 108 in FIGS. 1-12), or a liquid alone.

Figure 16:
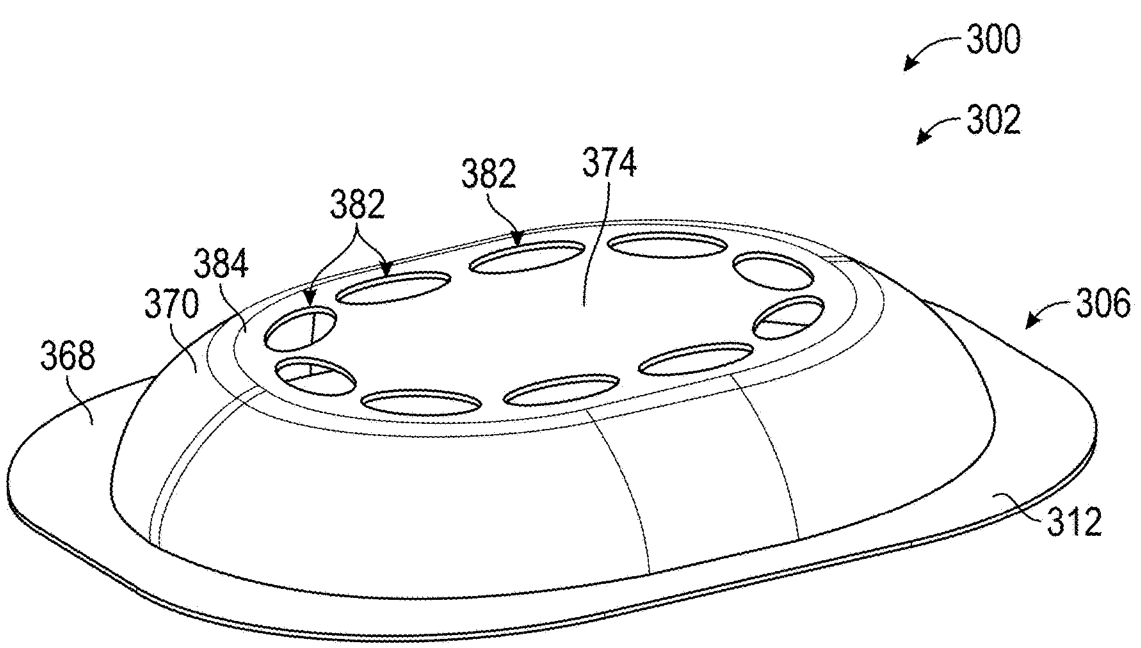
FIG. 16 is an exploded view of the bait station of FIG. 15.
Figure 16:
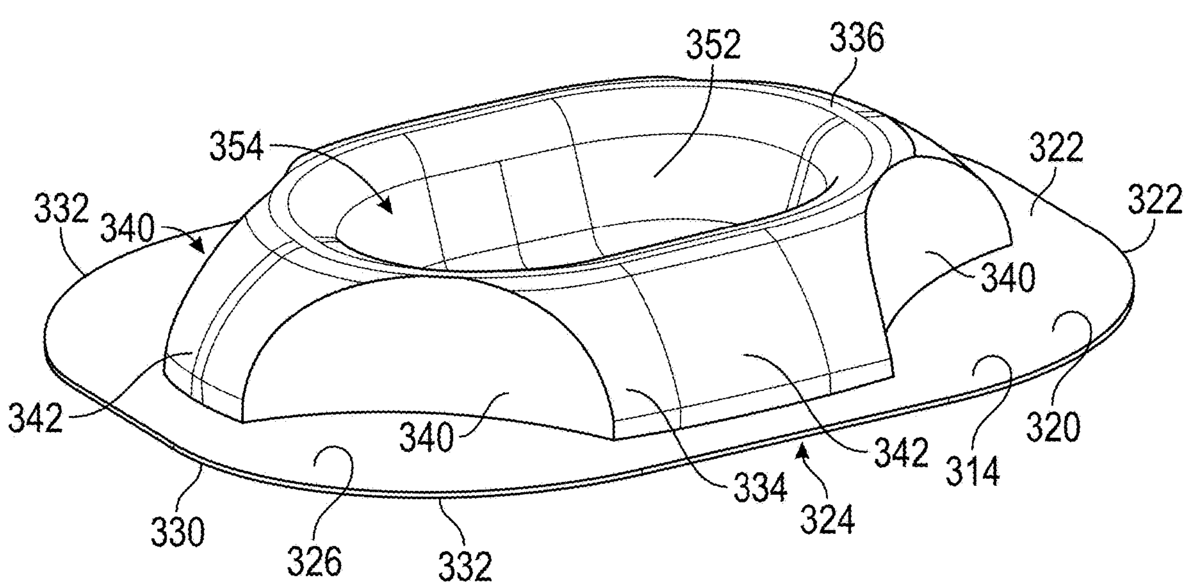
Figure 17:
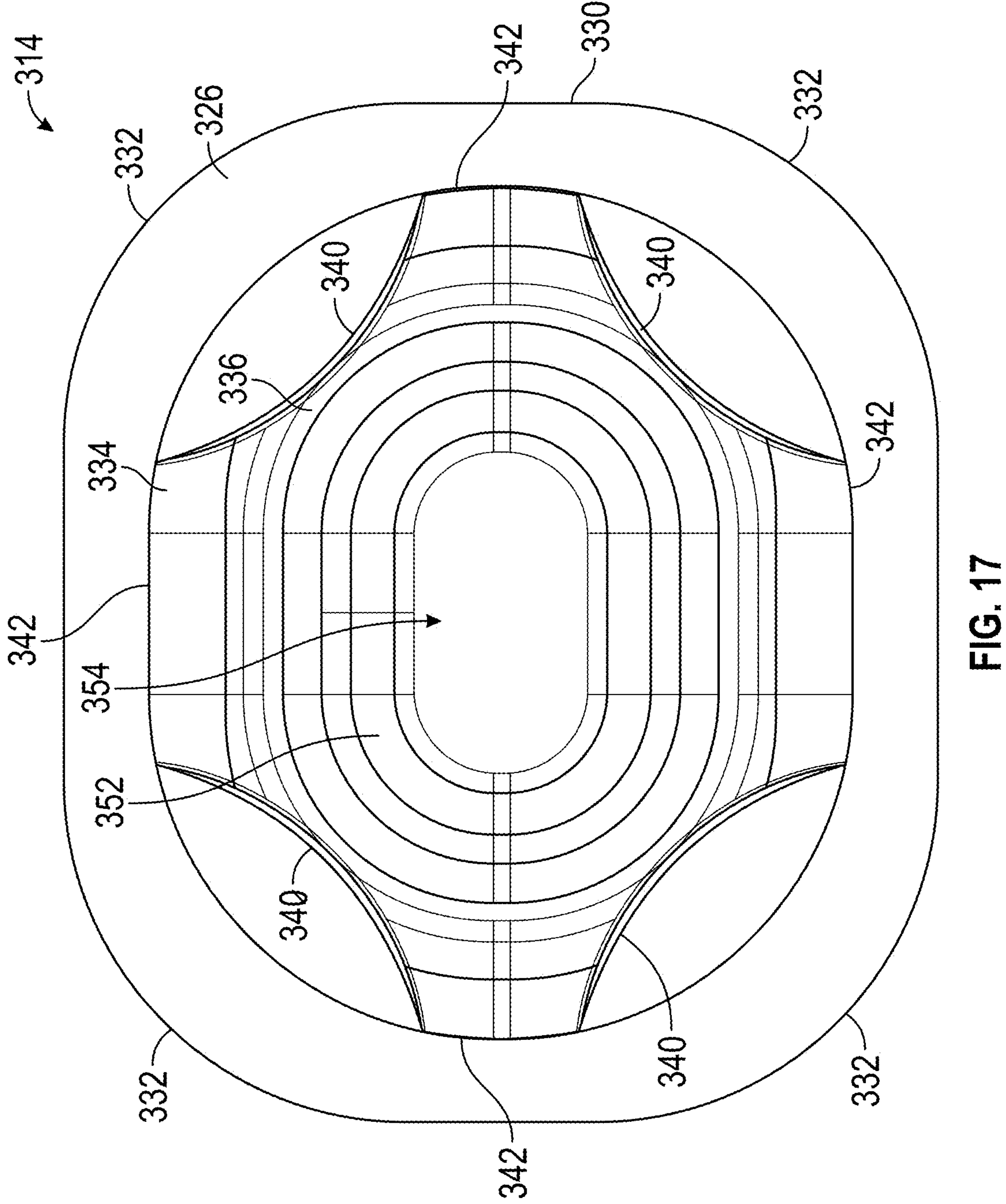
FIG. 17 is a top view of a component of the bait station of FIG. 15.
Figure 18:
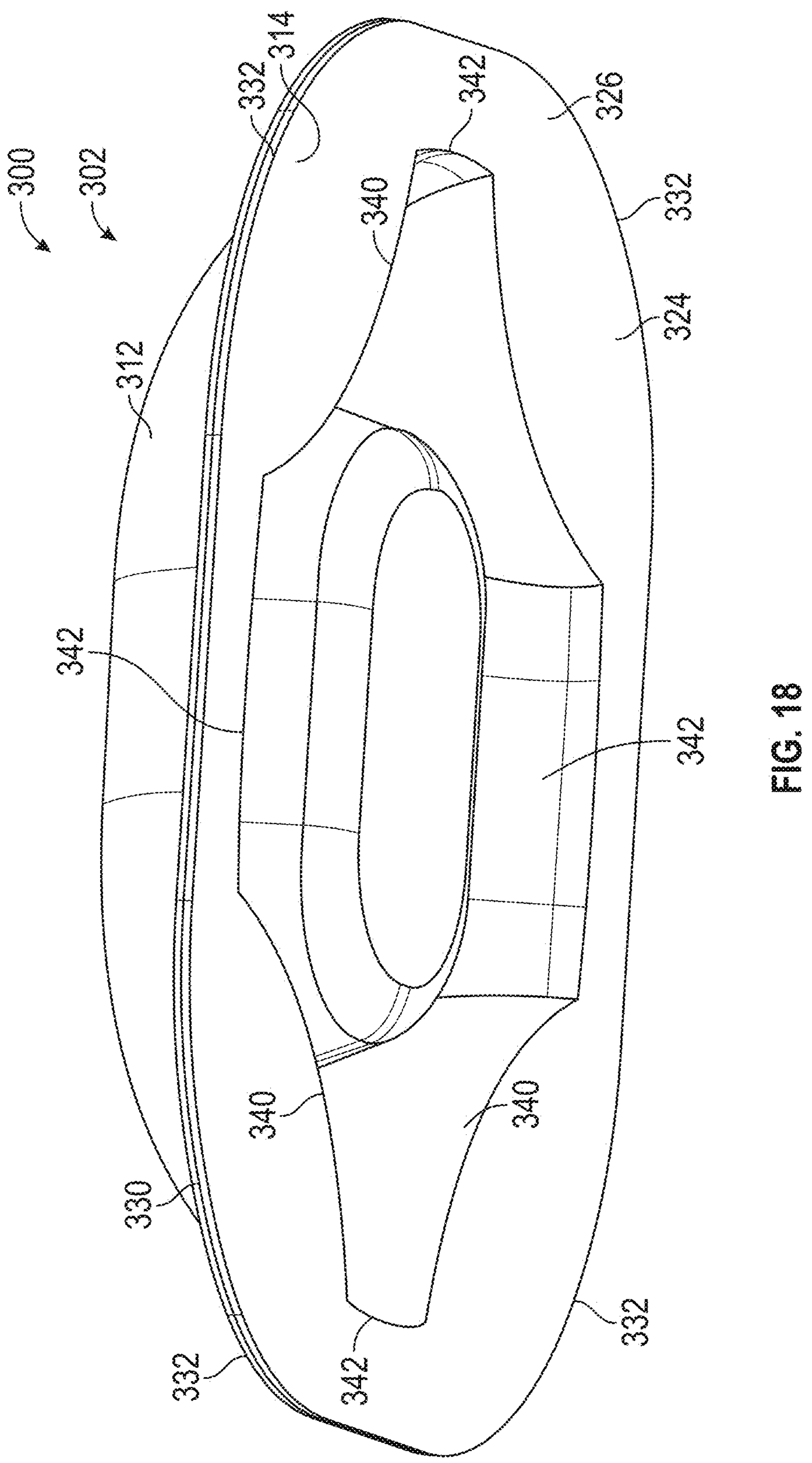
FIG. 18 is a bottom and front perspective view of the bait station of FIG. 15.

Referring to FIG. 16, the bait station 300 is shown disassembled. As mentioned above, the housing 306 is configured to hold or retain a gel between the upper casing 312 and the lower casing 314. The lower casing 314 is a substantially planar component that has a rectangular profile and includes a base 320 having a first surface 322 and a second surface 324 facing opposite directions, and a peripheral flange 326 that defines an outer edge 330 having curved corners 332. Further, the lower casing 314 includes an outer wall 334 that is spaced apart from the outer edge 330 and extends upwardly from the flange 326 to a top edge 336. The outer wall 334 includes curved sections 340 and substantially straight sections 342. More specifically, as best seen in FIG. 17, the outer wall 334 includes a curved section 340 adjacent each curved corner 332 of the outer edge 330. Each curved sections 340 is arranged so that its curvature is opposite a curvature of the corresponding curved corner 332. The substantially straight sections 342 extend between each curved section 340 and extend substantially parallel to the outer edge 330 adjacent thereto. An inner wall 352 extends from the top edge 336 to the first surface 322 to define a curved receiving space 354 (see FIG. 16). The curved receiving space 354 predominately represents an oval or curved rectangular profile.

Figure 20:
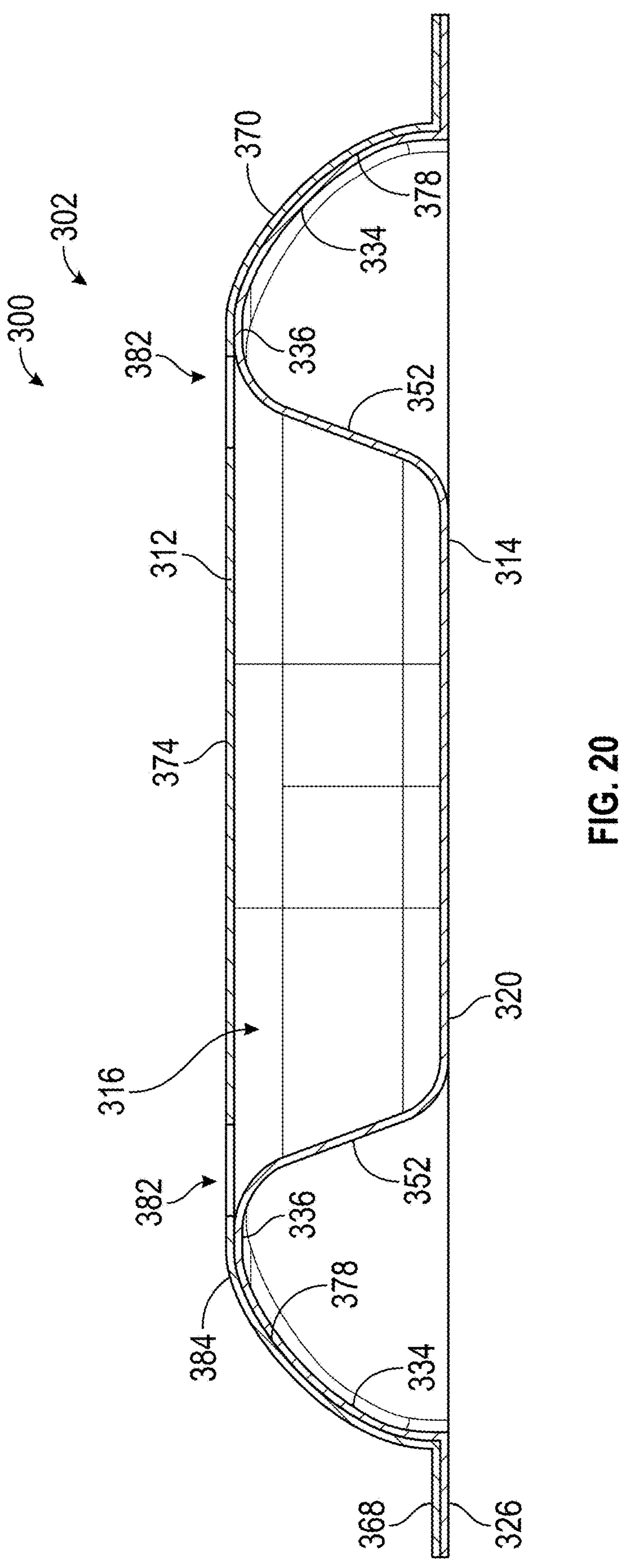
FIG. 20 is an elevational view of a cross-section taken through line 20-20 of FIG. 19.
Figure 21:
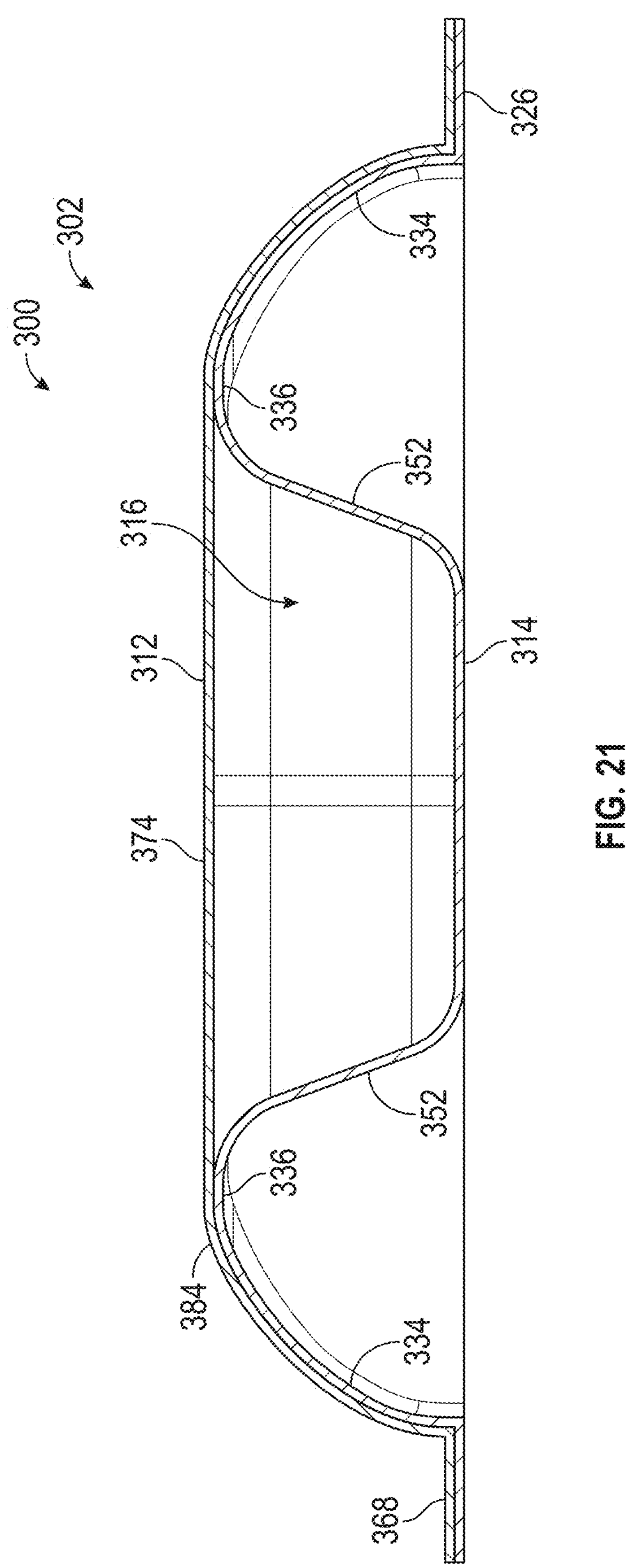
FIG. 21 is an elevational view of a cross-section taken through line 21-21 of FIG. 19.
Figure 22:
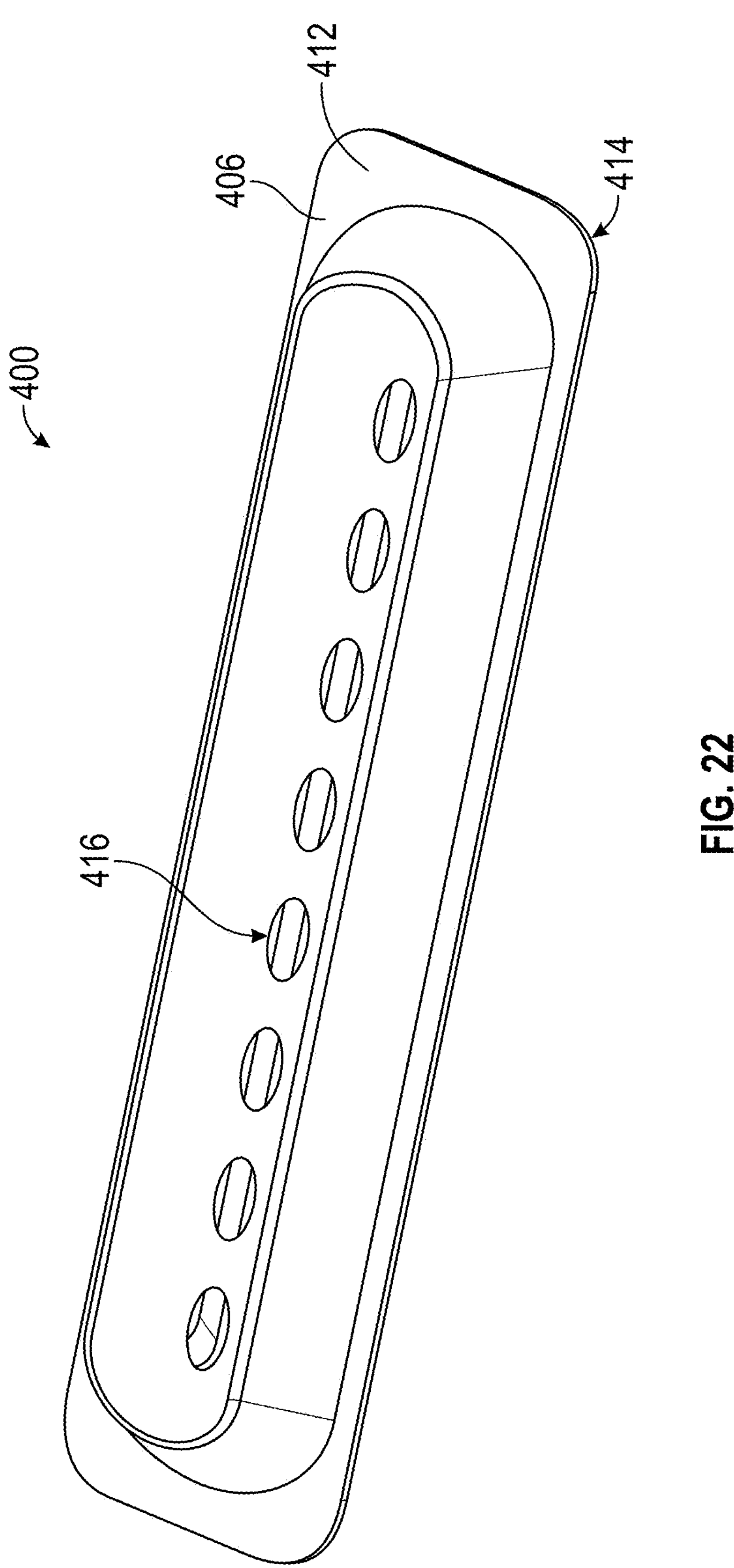
FIG. 22 is a front, top, and left side perspective view of yet another bait station in accordance with aspects of the present disclosure.

Returning to FIG. 15, the upper casing 312 includes an upper flange 366 that corresponds to a profile of the peripheral base flange 326, and further includes a dome 368 that extends upwardly from the upper flange 366 to a top surface 374. When the bait station 300 is assembled, the upper casing 312 is seated on and permanently secured to the base 320, such that the upper flange 366 is layered on the peripheral base flange 326. Further, as best seen in FIG. 20, and an interior surface 378 of the dome 368 rests against the outer wall 334 of the base 320. Once assembled, the dome 368 of the upper casing 312 and the inner wall 352 of the lower casing 314 cooperate to define the interior cavity 316 and provide a protective covering that encases the gel.

With reference again to FIG. 15, the upper casing 312 further includes a plurality of apertures 382 along the top surface 374 that provide access to the interior cavity 316. Similar to the apertures 182 shown in FIGS. 1-12, the apertures 382 provide entryways through which insects, such as ants, may enter and exit the housing 306. Similarly, prior to use, a peelable label 388 (see FIG. 31) is disposed over the apertures 382, which seals the apertures 382 and the interior cavity 316. The upper casing 312 and the lower casing 314 are constructed from a transparent or translucent material and, as a result, the gel and/or pad is visible to a user therethrough. In a different embodiment, one of the upper casing 312 and the lower casing 314 is constructed from a transparent or translucent material, e.g., the upper casing 312. Further, the upper casing 312 and/or the lower casing 314 of the housing 306 may be composed of a thermoplastic polymer, such as polypropylene.

Figure 19:
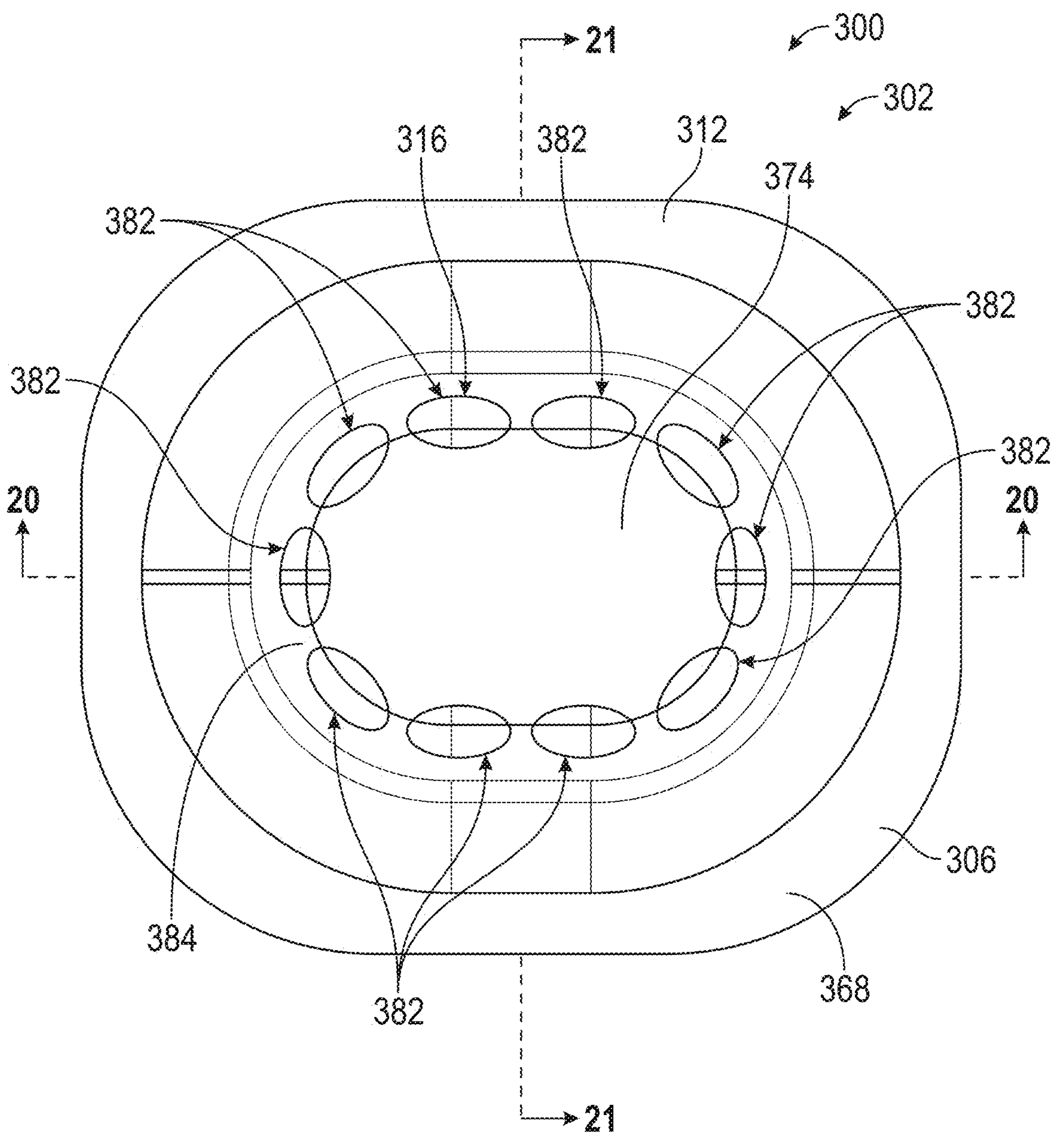
FIG. 19 is a top view of the bait station of FIG. 15.

Turning now to FIG. 19, as mentioned above, the upper casing 312 includes the plurality of apertures 382 disposed on the top surface 374 to provide access to the interior cavity 316. The apertures 382 are sized to allow access to only ants and to prevent human contact. In the embodiment illustrated, ten apertures 382 are used. However, other embodiments may implement more or fewer apertures 382. Similarly, although the apertures 382 of the illustrated embodiment are substantially oval in shape, other embodiments may implement apertures that are rectangular, circular, square, triangular, etc. The apertures 382 are arranged in a circular pattern along a top edge 384 of the upper casing 312. Additional embodiments may implement arrangements of apertures 382 in alternative configurations.

Referring to FIGS. 20, a cross-sectional view of the bait station 300 is shown. The plurality of apertures 382 are positioned on the top surface 374 adjacent the dome 368 of the upper casing 312. More specifically, and as best illustrated in FIG. 19, the plurality of apertures 382 are arranged along an oval path spaced inward from the dome 368. As a result, the plurality of apertures 382 provide access to the interior cavity 316. Further, because the apertures 382 extend around an entire outer perimeter of the interior cavity 316, insects can access the interior cavity 316 from any surrounding direction.

FIGS. 22-27 illustrate a bait station 400 according to another embodiment of the present disclosure. Similar to the aforementioned embodiments, the configuration of these components for, and their inclusion in, the bait station 400 is presented as an example only. Further, the bait station 400 may be similar in design and functionality to the bait station 100 of FIGS. 1-12, with similar elements identified using like reference numerals, except as described herein or as apparent from the figures.

Figure 23:
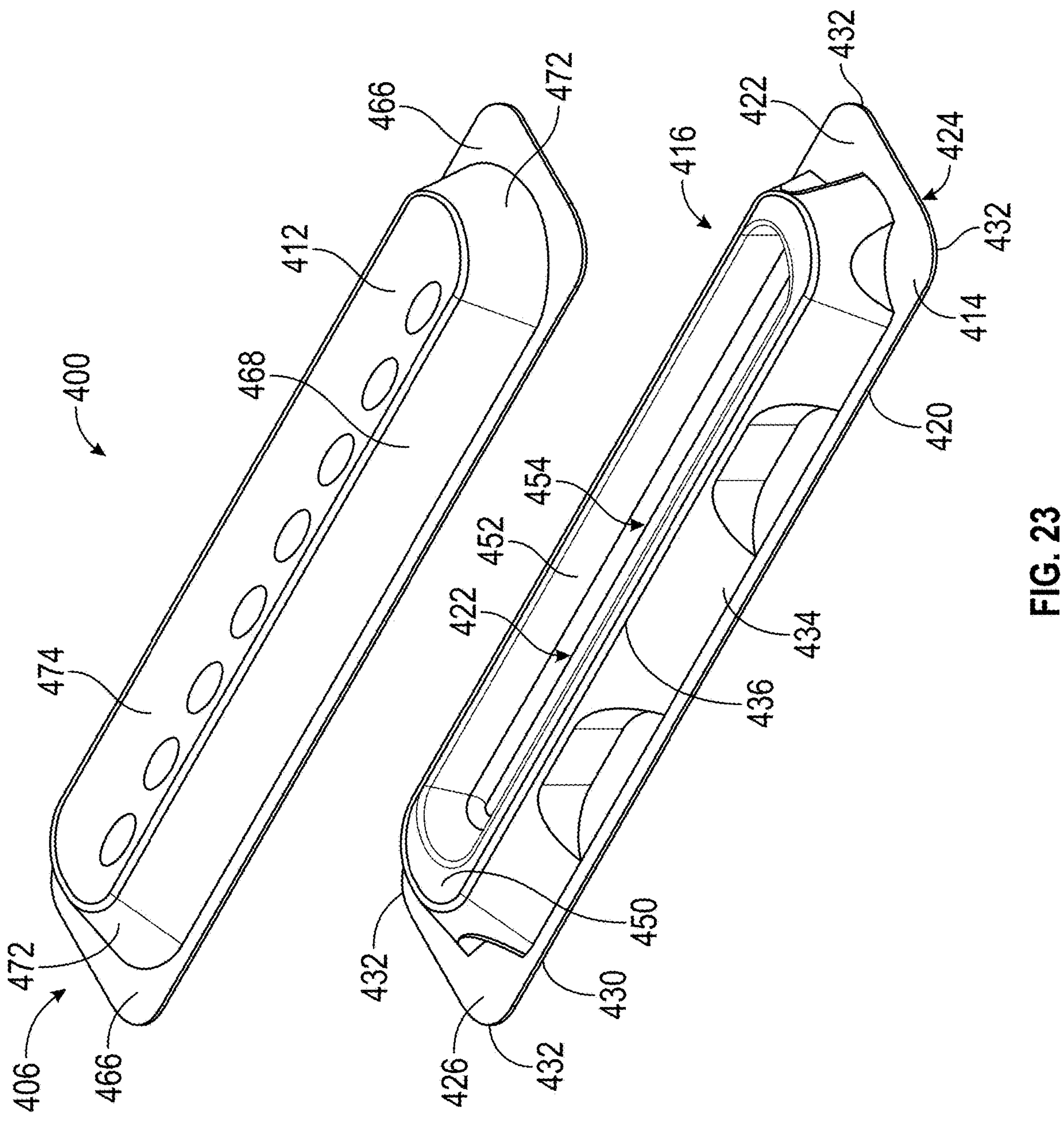
FIG. 23 is an exploded view of the bait station of FIG. 22.

Referring to FIG. 23, the bait station 400 includes a housing 406 that is configured to hold a liquid therein. The housing 406 includes an upper casing 412 and a lower casing 414 that are coupled together, e.g., via a fit or adhesive, to form an interior cavity 416. Although FIGS. 22-27 do not depict the bait station 400 with a liquid disposed therein, the bait station 400 may be configured to hold the liquid. Further, the bait station 400 may hold other compositions therein. For example, the bait station 400 may carry the gel 296 shown in FIGS. 13 and 14. Additionally or alternatively, the bait station 400 may hold a liquid soaked feeding pad (see, e.g., the liquid soaked feeding pad 108 in FIGS. 1-12).

Like the aforementioned embodiments, the upper casing 412 and the lower casing 414 are constructed from a transparent or translucent material and, as a result, the pad, gel, and/or liquid is visible to a user therethrough. In a different embodiment, one of the upper casing 412 and the lower casing 414 is constructed from a transparent or translucent material, e.g., the upper casing 412. Further, the upper casing 412 and/or the lower casing 414 of the housing 406 may be composed of a thermoplastic polymer, such as polypropylene.

Still referring to FIG. 23, the bait station 400 is shown disassembled. As mentioned above, the housing 406 is configured to hold or retain liquid between the upper casing 412 and the lower casing 414. The lower casing 414 is a substantially planar component that has a rectangular profile and includes a base 420 having a first surface 422 and a second surface 424 facing opposite directions, and a peripheral flange 426 that defines an outer edge 430 having curved corners 432. Further, the lower casing 414 includes an outer wall 434 that is spaced apart from the outer edge 430 and extends upwardly from the peripheral base flange 426 to a top edge 436.

Figure 24:
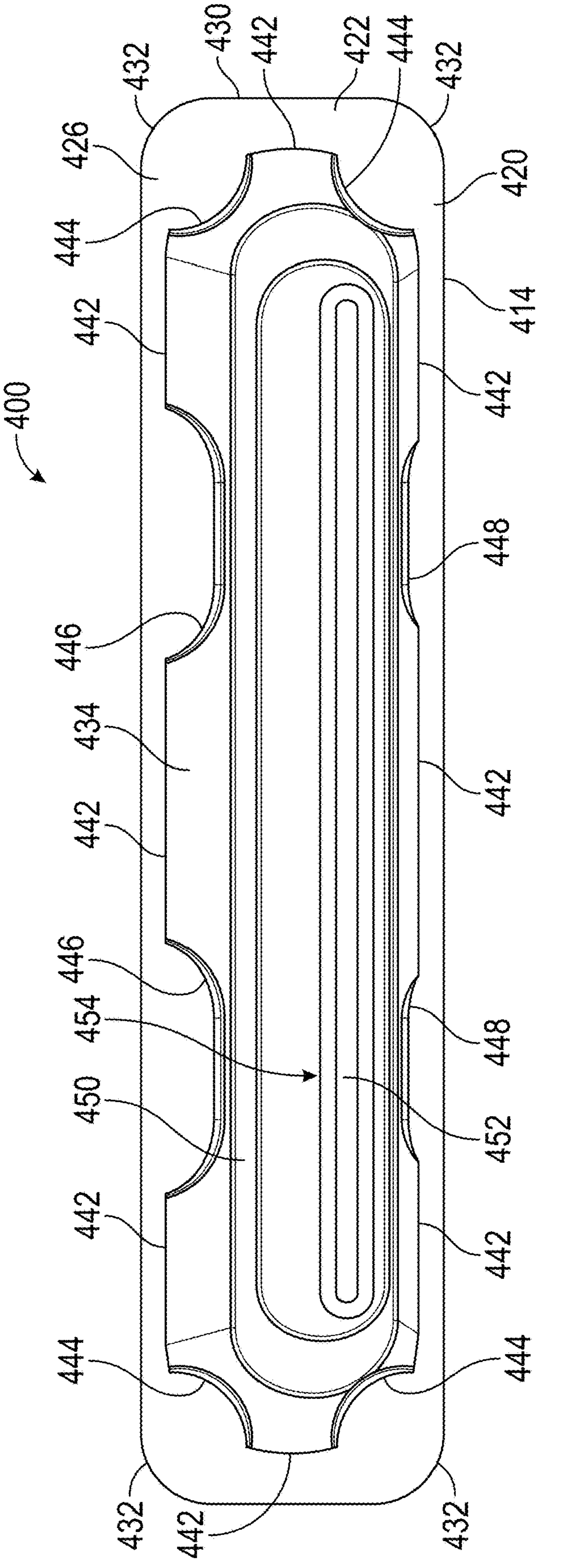
FIG. 24 is a top view of a component of the bait station of FIG. 22.
Figure 25:
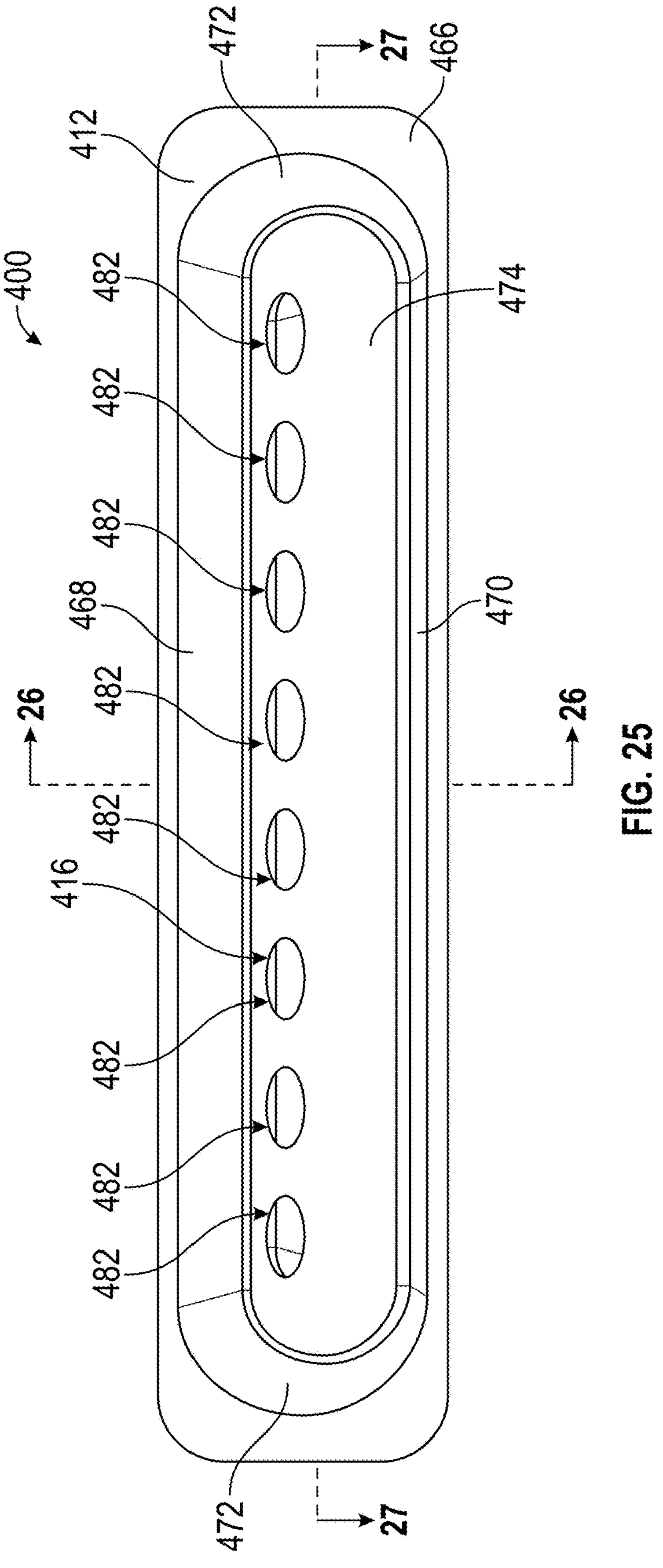
FIG. 25 is a top view of the bait station of FIG. 22.

Referring to FIG. 24, the outer wall 434 includes curved sections and substantially straight sections 442. More specifically, FIG. the outer wall 434 includes first curved sections 444 adjacent each curved corner 432 of the outer edge 430. Each of the first curved sections 444 is arranged so that its curvature is opposite a curvature of the corresponding curved corner 432. Further, the outer wall 434 includes second curved sections 446 disposed on a first side thereof. The second curved sections 446 are equally spaced along a length of the lower casing 414. Third curved sections 448 are provided on a second side of the outer wall 434 so that they correspond to the second curved sections 446 along the length of the lower casing 414. The second curved sections 446 of the outer wall 434 extend substantially perpendicularly from the first surface 422 and have a semi-oval profile. Similarly, the third curved sections 448 of the outer wall 434 extend substantially perpendicularly from the first surface 422 and have a semi-oval profile that is smaller than the semi-oval profile of the second curve sections 446. The substantially straight sections 442 extend between each of the first, second, and third curved sections 444, 446, 448 and are shaped to be substantially parallel to the outer edge 430 adjacent thereto.

Figure 26:
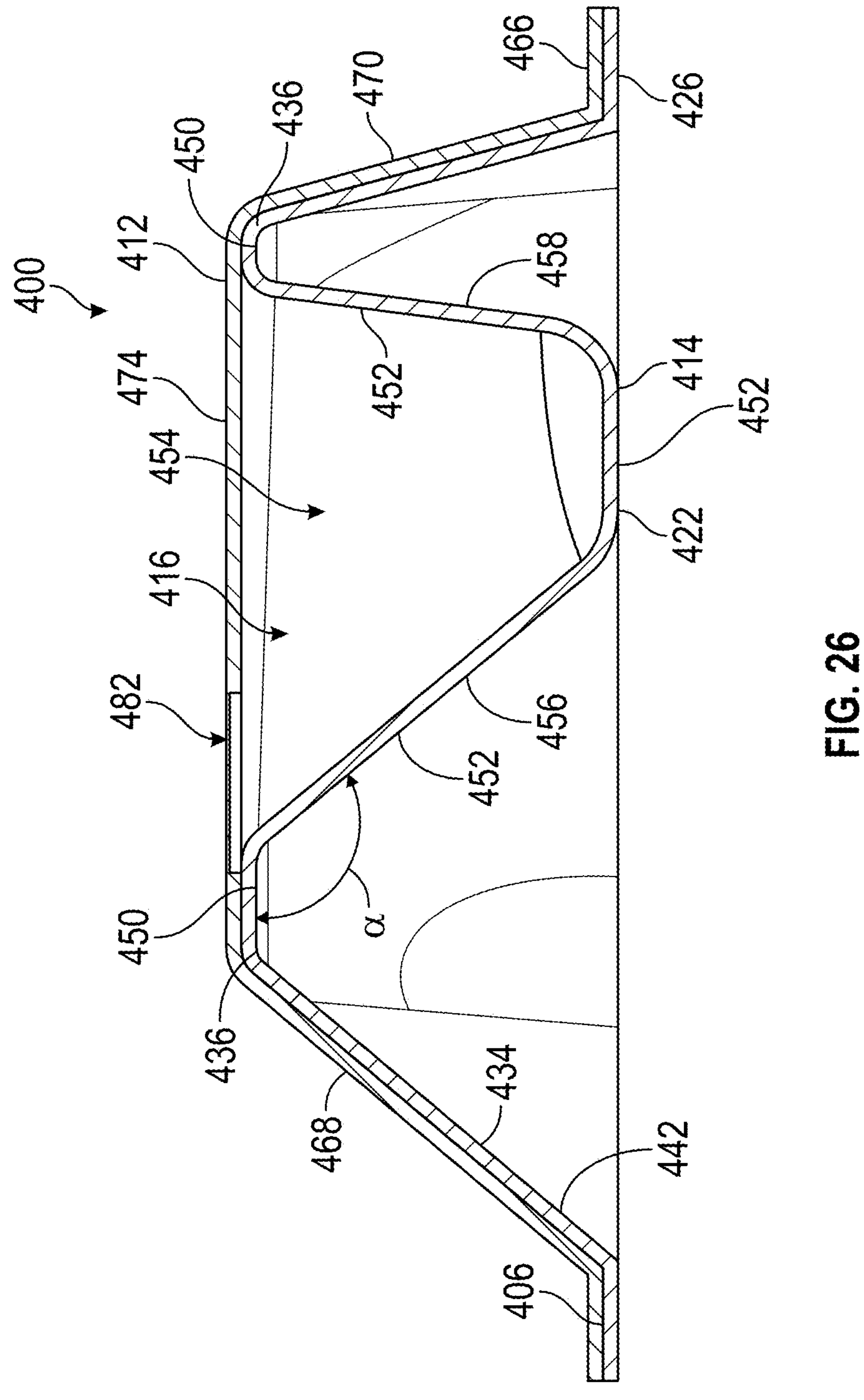
FIG. 26 is a side cross-sectional view taken through line 26-26 of FIG. 25.

Referring to FIG. 26, a base top surface 450 extends from the top edge 436 to an inner wall 452. The inner wall 452 extends from the top surface 450 to the first surface 422 to define a receiving space 454. The receiving space 454 predominately represents an elongate channel (see FIG. 24). Further, as best seen in FIG. 26, the inner wall 452 includes sections having varying pitches. More specifically, the inner wall 452 includes a first pitch section 456 that may extend from the base top surface 450 at an angle $\alpha$. In some instances, the angle $\alpha$ may be greater than 90 degrees. In some instances, the angle $\alpha$ may be greater than 100 degrees. The inner wall 452 also includes sections that extend substantially perpendicularly from the base top surface 450. For example, the inner wall 452 includes a second pitch section 458 that extends substantially perpendicularly from the base top surface 450.

Figure 27:
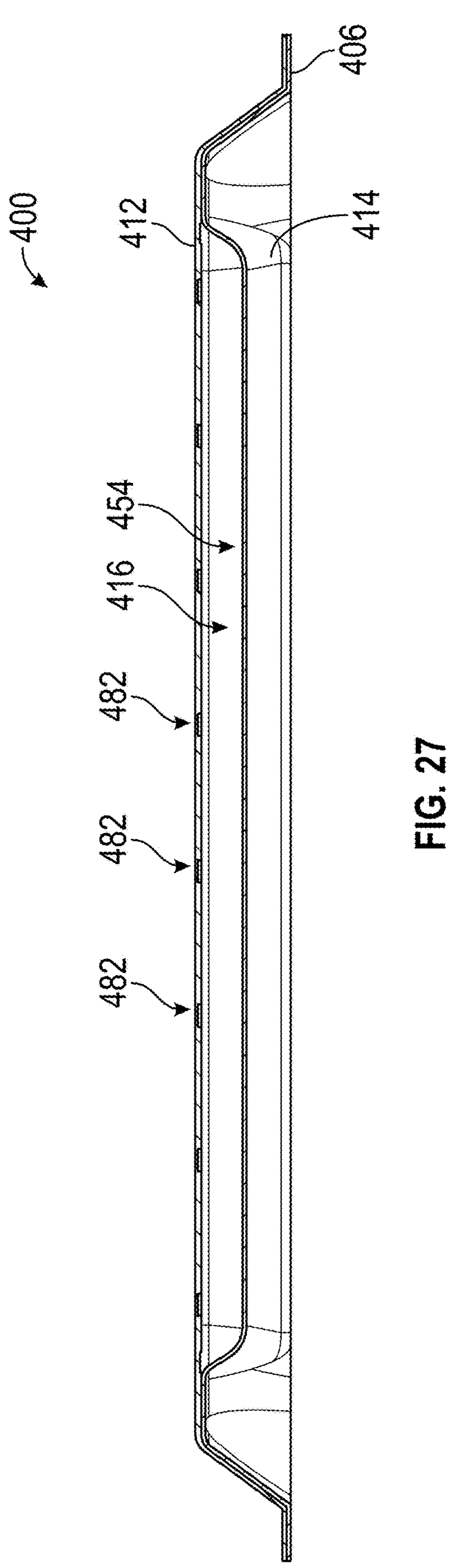
FIG. 27 is a cross-sectional view taken through line 27-27 of FIG. 25.

Referring to FIG. 27, a cross-sectional view of the bait station 400 is illustrated. The receiving space 454 extends along a length of the lower casing 414. In some instances, the receiving space 454 may extend along at least 60% the length of the lower casing 414. Further, in some instances, the receiving space 454 may extend along at least 75% the length of the lower casing 414.

Turning back to FIG. 25, the upper casing 412 includes an upper flange 466 that corresponds to a profile of the peripheral base flange 426 (see, e.g., FIG. 23). The upper casing 412 further includes a first ramped surface 468 and a second ramped surface 470 that are connected to each other by side walls 472. In the illustrated embodiment, the side walls 472 are generally curved walls; however, they may be straight in alternative embodiments. The first ramped surface 468, the second ramped surface 470, and the side walls 472 extend from the upper flange 466 to a top surface 474 at varying pitches. For example, as best seen in FIG. 26, the first ramped surface 468 may be angled from the upper flange 466 at an angle greater than 90 degrees. Further, in some instances, the angle may be greater than 110 degrees. The second ramped surface 470 may be angled from the flange 466 at an angle similar to or less than the angle of the first ramped surface 468. Furthermore, in some embodiments, the second ramped surface 470 may be angled from the flange 466 between 90 degrees and 100 degrees. Therefore, when in use, the upper flange 466 adjacent the second ramped surface 470 may be disposed in a corner such that the second ramped surface 470 is proximate a wall or surface that insects, e.g., ants, may be traveling on.

When the bait station 400 is assembled, the upper casing 412 is seated on and permanently secured to the base 420, such that the upper flange 466 is layered on the peripheral base flange 426, and an interior surface of the first ramped surface 468, the second ramped surface 470, and the side walls 472 rest against the outer wall 434 of the lower casing 414. Once assembled, the top surface 474 of the upper casing 412 and the inner wall 452 of the lower casing 414 cooperate to define the interior cavity 416 and provide a protective covering that encases the liquid, gel, and/or pad.

Figure 28:
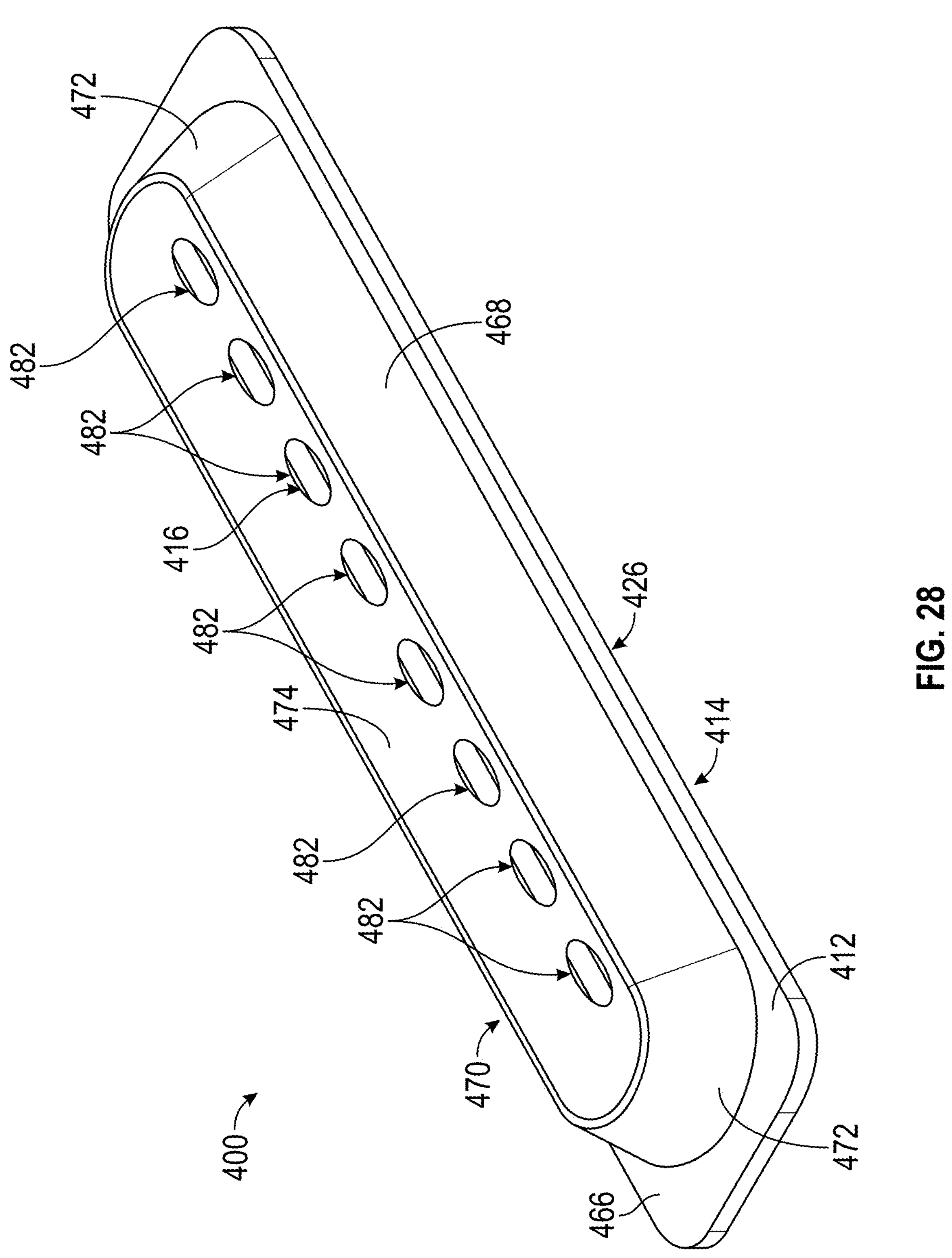
FIG. 28 is a front, top, and right side perspective view of the bait station of FIG. 22.
Figure 29:
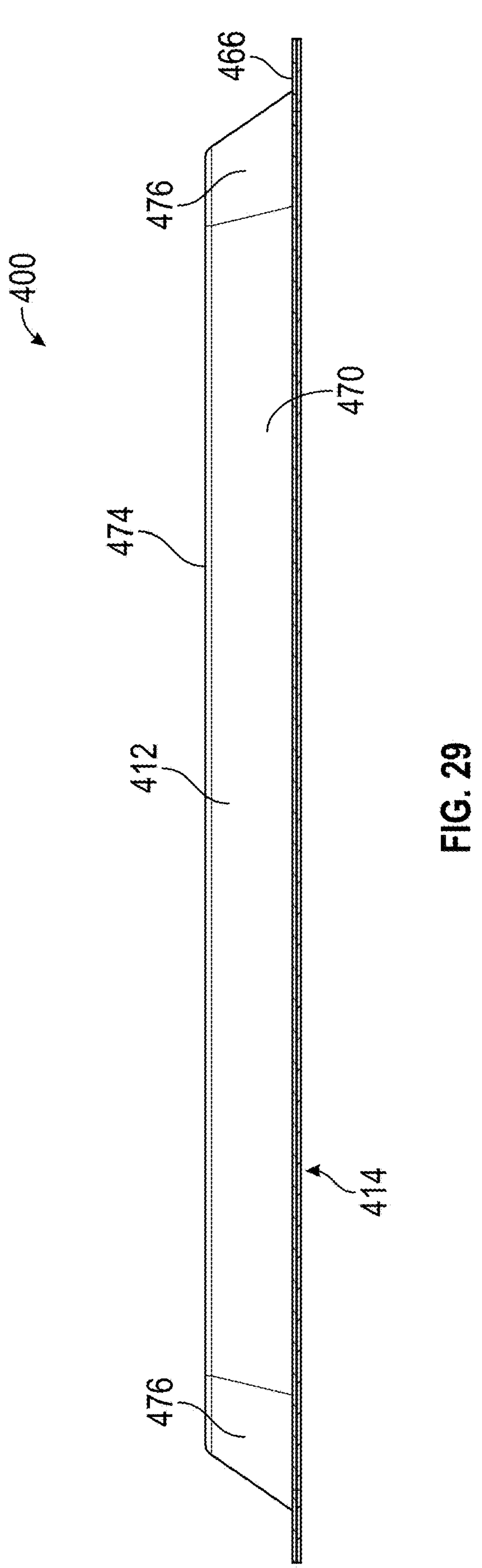
FIG. 29 is a front view of the bait station of FIG. 22.

Referring to FIG. 28, the upper casing 412 further includes a plurality of apertures 482 on the top surface 474 that provide access to the interior cavity 416. Similar to the apertures 182 shown in FIGS. 1-14, the apertures 482 provide entryways through which insects, such as ants, may enter and exit the housing 406. The apertures 482 are sized to only allow access to ants, and prevent human contact. In the embodiment illustrated, eight apertures 482 are used. However, other embodiments may use more or fewer apertures 482. Similarly, although the apertures 482 of the illustrated embodiment are substantially oval in shape, other embodiments may use apertures that are rectangular, circular, square, triangular, etc. in shape. The apertures 482 are arranged in a linear pattern along a length of the upper casing 412. Additional embodiments may use any arrangement of apertures 482. Like the aforementioned embodiments, prior to use, a peelable label 488 (see FIG. 32) is disposed over the apertures 482, which seals the apertures 482 and the interior cavity 416.

Returning again to FIG. 26, accordingly, the first ramped surface 468 provides insects, such as ants, access to the interior cavity 416. More specifically, the first ramped surface 468 provides a ramp for ants to travel on to reach the plurality of apertures 482. Further, when the bait station 400 is assembled, the apertures 482 are disposed proximate the first pitch surface 456. Therefore, the apertures 482 provide access to the first pitched section 456 of the lower casing 414, which provides a path to the liquid for the ants.

Figure 30:
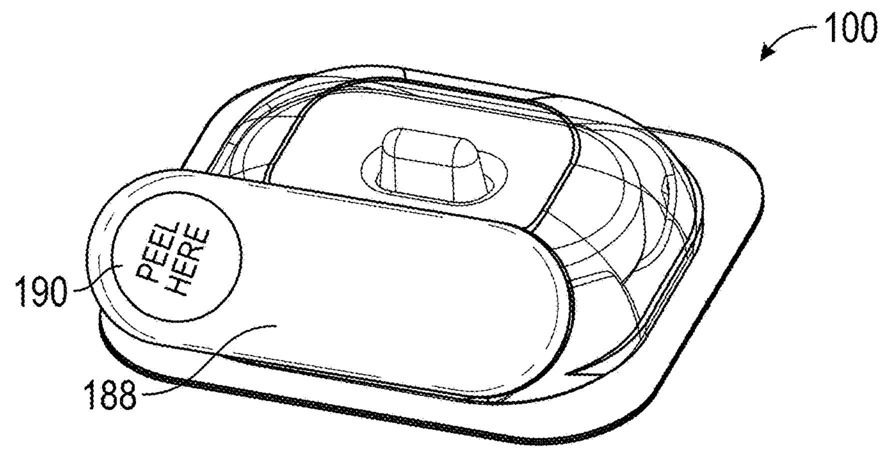
FIG. 30 is another embodiment of a bait station including a removable label, similar to the bait station of FIG. 1.
Figure 31:
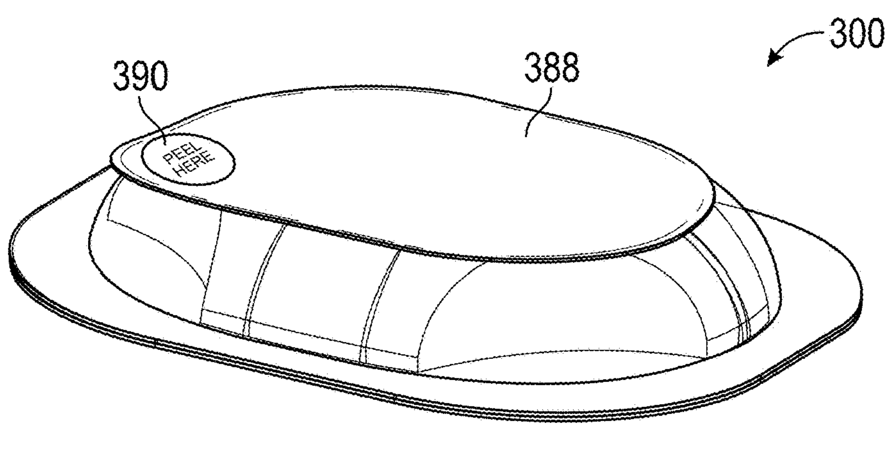
FIG. 31 is yet another embodiment of a bait station including a removable label, similar to the bait station of FIG. 15.
Figure 32:
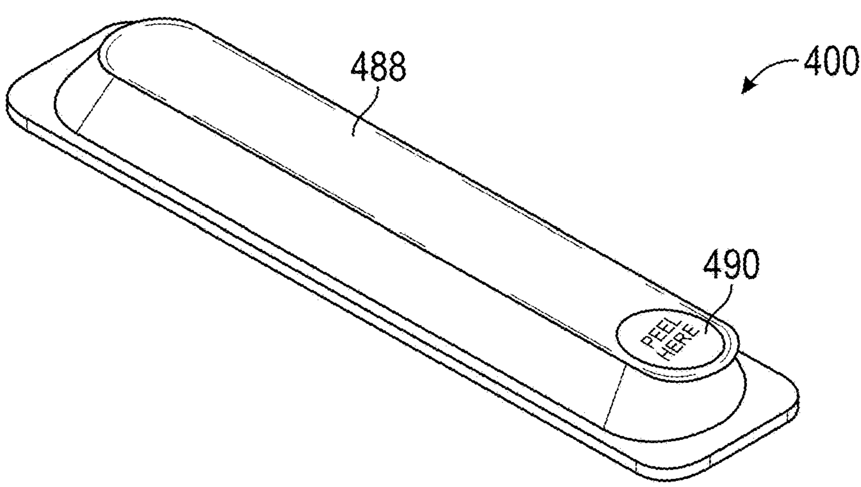
FIG. 32 is still another embodiment of a bait station including a removable label, similar to the bait station of FIG. 22.

Referring to FIGS. 30-32, each of the aforementioned bait stations 100, 300, 400 is shown. As previously discussed, each bait station according to the present disclosure may include a peelable label disposed over the respective apertures. The peelable label may be a foil sheet that is heat sealed to the bait station. Therefore, activation and use of the bait station requires removal of the peelable label. For example, referring to FIG. 30, the bait station 100 includes the peelable label 188 over the apertures 182 disposed on the upper ramped front surface 184 (see, e.g., FIG. 6). An end 190 of the peelable label 188 is configured to be pulled to remove the label 188 and activate the bait station 100.

Similarly, referring to FIG. 31, the bait station 300 includes the peelable label 388 over the apertures 382 disposed along the top surface 374 (see, e.g., FIG. 15). A corner 390 of the peelable label 388 is configured to be pulled to remove the label 388 and activate the bait station 300. FIG. 32 illustrates the bait station 400 having a peelable label 488 disposed over the apertures 482 on the top surface 474 (see, e.g., FIG. 27). Similar to the aforementioned embodiments, an end 490 of the label is configured to be pulled to remove the label 488 and activate the bait station 400. The peelable label thus enhances a bait station's shelf life. Additionally, the label ensures that the bait station remains spill resistant during storage even when the bait station houses a liquid therein.

INDUSTRIAL APPLICABILITY

Numerous modifications will be apparent to those skilled in the art in view of the foregoing description. Accordingly, this description is to be construed as illustrative only and is presented for the purpose of enabling those skilled in the art to make and use the embodiments disclosed herein. The exclusive rights to all modifications which come within the scope of the application are reserved.

We claim:

1. A bait station, comprising:

a lower casing including a base wall and a flange, the lower casing including an inner wall extending upward from the base wall toward a top wall, and an outer wall extending downward from the top wall toward the flange; and an upper casing including a dome having a top surface, the dome having an upper ramped front surface including a plurality of apertures arranged in a side-by-side arrangement, wherein the upper casing is coupled to the lower casing, and wherein the plurality of apertures is disposed above the top wall.

2. The bait station of claim 1, wherein the inner wall includes protrusions along a second side of the bait station.

3. The bait station of claim 2, wherein the outer wall includes a ramped front surface defined along a first side of the bait station.

4. The bait station of claim 3, wherein the inner wall includes an inner ramped surface defined opposite of the ramped front surface along the first side of the bait station.

5. The bait station of claim 4, wherein the upper ramped front surface is defined along one side of the dome.

6. The bait station of claim 5, wherein the plurality of apertures is disposed along the first side of the bait station.

7. The bait station of claim 5, wherein the plurality of apertures of the upper casing is substantially rectangular, and wherein each of the plurality of apertures is arranged in a row along a length of the upper ramped front surface.

8. The bait station of claim 4, wherein the inner wall surrounds a receiving space, the inner ramped surface is disposed across from the protrusions, and a tapered post is disposed between the inner ramped surface and the protrusions.

9. The bait station of claim 8, wherein the tapered post is configured to receive a pad.

10. The bait station of claim 9, wherein a gap is defined between the pad, the gap extending around an entire outer perimeter of the pad to enable insects to access the entire outer perimeter of the pad.

11. The bait station of claim 10, wherein the gap between a periphery of the inner wall along the first side of the base wall is greater than the gap between the periphery of the inner wall along the second side of the base wall.

12. The bait station of claim 10, wherein the upper ramped front surface is configured to guide insects up toward the plurality of apertures, wherein the inner ramped surface is configured to guide insects down toward the gap disposed between the outer perimeter of the pad, and wherein the gap enables insects to walk freely around the pad from the first side toward the second side of the bait station.

13. A bait station, comprising:

a housing that includes an upper casing and a lower casing coupled to form an interior cavity; and a pad disposed within the interior cavity, wherein the lower casing includes a base having an outer wall that is spaced from an outer edge and extends upward from the base to a top edge, an inner wall that extends downward from the top edge to a receiving space, the receiving space having a tapered post, and an inner ramped surface spaced from the tapered post by a gap and extending toward the top edge, wherein the upper casing includes a front ramped surface, wherein the front ramped surface of the upper casing is configured to guide insects through a plurality of apertures into the interior cavity, wherein the inner ramped surface of the lower casing is configured to guide insects down toward the gap, wherein the gap disposed between an outer perimeter of the pad enables insects to walk freely around from a first side of the housing toward a second side of the housing.

14. The bait station of claim 13, wherein the gap along the first side of the housing is greater than the gap along the second side of the housing.

15. The bait station of claim 13, wherein a peelable label is disposed along the front ramped surface to cover the plurality of apertures.

16. The bait station of claim 13, wherein the gap extends around an entire outer perimeter of the pad.

17. The bait station of claim 16, wherein the inner wall includes protrusions extending into the receiving space along the second side of the housing, and wherein at least two apertures are disposed opposite of the protrusions.

18. The bait station of claim 13, wherein the plurality of apertures is disposed side-by-side relative to one another.

19. The bait station of claim 18, wherein a portion of the plurality of apertures rests directly above the top edge of the lower casing along the first side of the housing.

20. The bait station of claim 19, wherein the plurality of apertures is disposed along one side of the upper casing.

* * * * *